(12) United States Patent
Harviainen

(10) Patent No.: US 11,900,532 B2
(45) Date of Patent: Feb. 13, 2024

(54) SYSTEM AND METHOD FOR HYBRID FORMAT SPATIAL DATA DISTRIBUTION AND RENDERING

(71) Applicant: InterDigital VC Holdings, Inc., Wilmington, DE (US)

(72) Inventor: Tatu V. J. Harviainen, Helsinki (FI)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/619,183

(22) PCT Filed: Jun. 29, 2020

(86) PCT No.: PCT/US2020/040079
§ 371 (c)(1),
(2) Date: Dec. 14, 2021

(87) PCT Pub. No.: WO2020/264481
PCT Pub. Date: Dec. 30, 2020

(65) Prior Publication Data
US 2022/0309743 A1     Sep. 29, 2022

Related U.S. Application Data

(60) Provisional application No. 62/868,123, filed on Jun. 28, 2019.

(51) Int. Cl.
*G06T 15/50*     (2011.01)
*G06T 5/50*      (2006.01)
*H04L 67/12*     (2022.01)

(52) U.S. Cl.
CPC ............ *G06T 5/50* (2013.01); *G06T 2200/16* (2013.01); *G06T 2210/61* (2013.01); *H04L 67/12* (2013.01)

(58) Field of Classification Search
CPC .............. G06F 16/583; G06F 16/5854; G06F 16/5866; G06F 16/58; G06F 16/587;
(Continued)

(56) References Cited

U.S. PATENT DOCUMENTS 9,786,027 B1     10/2017 Cooley
2009/0300144 A1  12/2009 Marr
(Continued)

FOREIGN PATENT DOCUMENTS

CN     102113003     6/2011
CN     102763068     10/2012
(Continued)

OTHER PUBLICATIONS

International Search Report and Written Opinion of the International Searching Authority for PCT/US2020/040079 dated Aug. 14, 2020 (10 pages).

(Continued)

*Primary Examiner* — Hau H Nguyen
(74) *Attorney, Agent, or Firm* — Klintworth & Rozenblat IP LLP

(57) ABSTRACT

Systems and methods are described for providing spatial content using a hybrid format. In some embodiments, a client device receives, from a server, surface light field representations of a plurality of scene elements in a 3D scene, including a first scene element. The client device provides to the server an indication of a dynamic behavior of a second scene element different from the first scene element. Further, in response to the indication, the client device receives from the server information defining the first scene element in a 3D asset format. The client device then renders at least the first scene element in the 3D asset format.

14 Claims, 15 Drawing Sheets

(58) Field of Classification Search
CPC ..... G06F 3/011; G06T 15/50; G06T 2200/16; G06T 2215/16; G06T 15/00; G06T 17/00; G06T 2210/61

See application file for complete search history.

(56) References Cited

U.S. PATENT DOCUMENTS

| | | | |
|---|---|---|---|
| 2011/0202603 | A1 | 8/2011 | Mate |
| 2012/0249550 | A1* | 10/2012 | Akeley ............. H04N 21/6582 345/419 |
| 2013/0262511 | A1 | 10/2013 | Kuffner, Jr. |
| 2015/0116327 | A1 | 4/2015 | Nielsen |
| 2015/0348327 | A1 | 12/2015 | Zalewski |
| 2015/0350628 | A1 | 12/2015 | Sanders |
| 2017/0078447 | A1* | 3/2017 | Hancock ............ H04N 21/4424 |
| 2017/0178400 | A1 | 6/2017 | Boulkenafed |
| 2018/0115770 | A1 | 4/2018 | Salahieh |
| 2018/0350136 | A1* | 12/2018 | Rowley .................. G06T 19/00 |
| 2020/0089458 | A1 | 3/2020 | Harviainen |

FOREIGN PATENT DOCUMENTS

| | | |
|---|---|---|
| CN | 105912234 | 8/2016 |
| CN | 107274469 A | 10/2017 |
| CN | 108139803 | 6/2018 |
| EP | 3489955 | 5/2019 |
| WO | 2018200337 | 11/2018 |

OTHER PUBLICATIONS

Github, "GoogleVR/SEURAT". Github, Inc., web page available at: https://github.com/googlevr/seurat, visited on Jun. 26, 2019 (7 pages).

International Preliminary Report on Patentability for PCT/US2020/040079 dated Dec. 28, 2021 (7pages).

Shum, H.Y., et al., "Survey Of Image-Based Representations and Compression Techniques" IEEE Transactions on Circuits and Systems for Video Technology, vol. 13 No. 11, Nov. 2003, pp. 1020-1037 (18 pages).

Li, W., et a., "Robust surface light field modeling." In 2018 IEEE Conference on Multimedia Information Processing and Retrieval (MIPR), pp. 321-327. IEEE, 2018 (7 pages).

TechCrunch. Google's Seurat for mobile VR means you can finally truly step into Star Wars. On-line article viewed Dec. 8, 2022, https://techcrunch.com/2017/05/18/googles-seurat-for-mobile-vr-means-you-can-finally-truly-step-into-star-wars/.

Shu, S. "A Real-Time Remote Rendering System for Interactive Mobile Graphics" ACM Transactions on Multimedia Computing, Communications, and Applications (TOMM) vol. 8, No. 3s, Sep. 2012, 1-20 (20 pages).

Wood, D. N., et al., "Surface light fields for 3D photography." In Proceedings of the 27th annual conference on Computer graphics and interactive techniques, pp. 287-296, 2000, (10 pages).

Miller, G., et al., "Lazy decompression of surface light fields for precomputed global illumination." In Eurographics Workshop on Rendering Techniques, Springer, Vienna, 1998 (12 pages).

Lall, P., et al., "View-Region Optimized Image-Based Scene Simplification." Proceedings of the ACM on Computer Graphics and Interactive Techniques vol. 1, No. 2 article 26, Aug. 2018, pp. 1-22 (22 pages).

Park, J. J., et al., "Surface light field fusion." In 2018 International Conference on 3D Vision (3DV), IEEE, 2018 (11 pages).

Yu, L., et al. "Digital Campus 3D Simulation System Based on Virtual Reality Technique". Computer Simulation No. 04, Apr. 30, 2004 (5 pages).

\* cited by examiner

SYSTEM AND METHOD FOR HYBRID FORMAT SPATIAL DATA DISTRIBUTION AND RENDERING

CROSS-REFERENCE SECTION

The present application is a national stage application under 35 U.S.C. § 371 of International Application No. PCT/US2020/040079, entitled "SYSTEM AND METHOD FOR HYBRID FORMAT SPATIAL DATA DISTRIBUTION AND RENDERING," filed on Jun. 29, 2020, which claims benefit under 35 U.S.C. § 119(e) from U.S. Provisional Patent Application Ser. No. 62/868,123, entitled "SYSTEM AND METHOD FOR HYBRID FORMAT SPATIAL DATA DISTRIBUTION AND RENDERING" filed Jun. 28, 2019, which is hereby incorporated by reference in its entirety.

BACKGROUND

Immersive displays have created a demand for realistic content in which a viewer can interact and navigate freely. Typically, only real-time three-dimensional (3D) rendering may enable such viewer experience.

SUMMARY

According to some embodiments a method, performed by a client device, includes: receiving, from a server, surface light field representations of a plurality of scene elements in a 3D scene, including a first scene element; providing to the server an indication of a dynamic behavior of a second scene element different from the first scene element; in response to the indication, receiving from the server information defining the first scene element in a 3D asset format; and rendering at least the first scene element in the 3D asset format.

In some embodiments, the method further includes: after providing to the server the indication of the dynamic behavior of the second scene element, receiving, from the server, a second indication of at least the first scene element being visually affected by the dynamic behavior of the second scene element. Further, in some embodiments, the method includes: receiving, from the server, scene description meta-data for the 3D scene; based on the scene description meta-data, requesting from the server the second scene element in the 3D asset format to be rendered locally at the client device; and receiving, from the server, information defining the second scene element in the 3D asset format.

Additionally, in some embodiments, the method further includes: in response to receiving the second indication of at least the first scene element being visually affected by the dynamic behavior of the second scene element, requesting, form the server, the first scene element in the 3D asset format locally at the client device. The scene description meta-data includes, in some embodiments, scene logic corresponding to assets around a current user location and timeline information for future events, and the method further includes using the indication of the dynamic behavior of the second scene element in combination with the scene logic to determine which one or more scene elements, the one or more scene elements including the first scene element, to request from the server in the 3D asset format. In some embodiments, providing to the server the indication of the dynamic behavior of the second element includes processing at least a user input and scene logic included in the scene description meta-data to determine the second element that has the dynamic behavior as a result of the processing.

Further, in some embodiments, the method includes: observing one or more performance metrics; and limiting an amount of interactive behavior in the 3D scene when a local rendering performance at the client device falls below a threshold. In this regard, in some embodiments, the one or more performance metrics include at least one of processing load or rendering frame rate. In some embodiments, limiting the amount of interactive behavior in the 3D scene includes limiting at least one of a number of interactive events or a number of scene elements having the dynamic behavior.

Yet further, in some embodiments, the method further includes: in addition to receiving, form the server, the information defining the first scene element in the 3D asset format, further receiving, from the server, one or more updated surface light field representations, wherein rendering at least the first scene element in the 3D asset format includes rendering a combination of the first scene element in the 3D asset format and the one or more updated surface light field representations.

According to some embodiments, a method performed by a server, includes sending, to a client device, surface light field representations of a plurality of scene elements in a 3D scene, including a first scene element; receiving, from the client device, an indication of a dynamic behavior of a second scene element different from the first scene element; determining that the first scene element is visually affected by the dynamic behavior of the second scene element; and in response to a determination that the first scene element is visually affected by the dynamic behavior of the second scene element, sending, to the client device, information defining the first scene element in a 3D asset format.

In some embodiments, the method further includes: after receiving from the client device the indication of the dynamic behavior of the second scene element, sending, to the client device, a second indication of at least the first scene element being visually affected by the dynamic behavior of the second scene element. Further, in some embodiments, the method includes: after receiving, from the client device, the indication of the dynamic behavior of the second scene element, updating one or more surface light field representations; and in addition to sending, to the client device, the information defining the first scene element in the 3D asset format, further sending, to the client to the client device, the one or more updated surface light field representations to be rendered locally at the client device in combination with the first scene element in the 3D asset format.

According to some embodiments, an apparatus includes a processor configured to perform at least: receiving, from a server, surface light field representations of a plurality of scene elements in a 3D scene, including a first scene element; providing to the server an indication of a dynamic behavior of a second scene element different from the first scene element; in response to the indication, receiving from the server information defining the first scene element in a 3D asset format; and rendering at least the first scene element in the 3D asset format.

In some embodiments, the processor is further configured to perform: after providing to the server the indication of the dynamic behavior of the second scene element, receiving, from the server, a second indication of at least the first scene element being visually affected by the dynamic behavior of the second scene element. Also, in some embodiments, the processor is further configured to perform: receiving, from the server, scene description meta-data for the 3D scene; based on the scene description meta-data, requesting, from the server, the second scene element in the 3D asset format to be rendered locally at the client device; and receiving, from the server, information defining the second scene element in the 3D asset format.

EXAMPLE NETWORKS FOR IMPLEMENTATION OF THE EMBODIMENTS

Figure 1A:
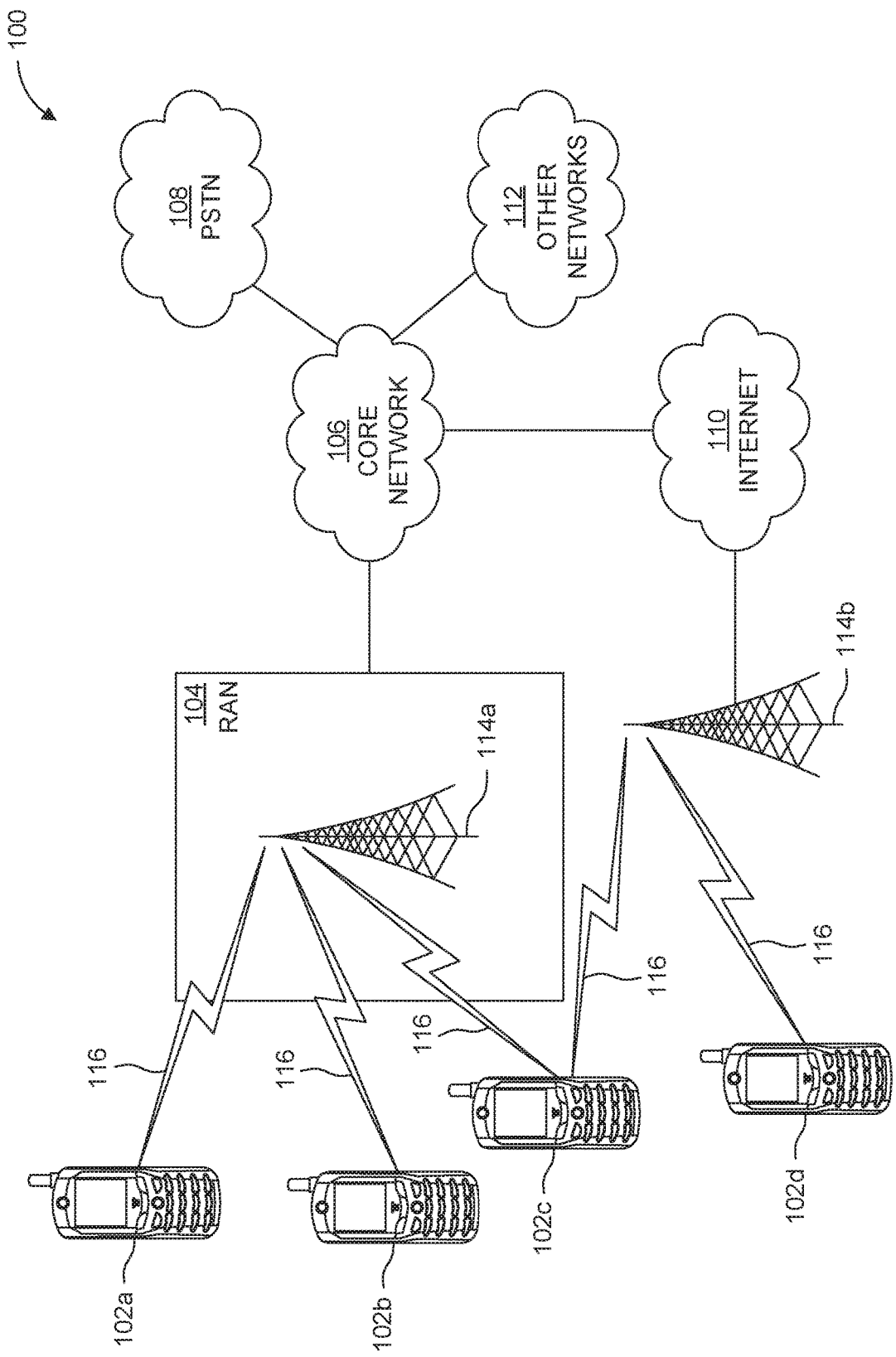
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
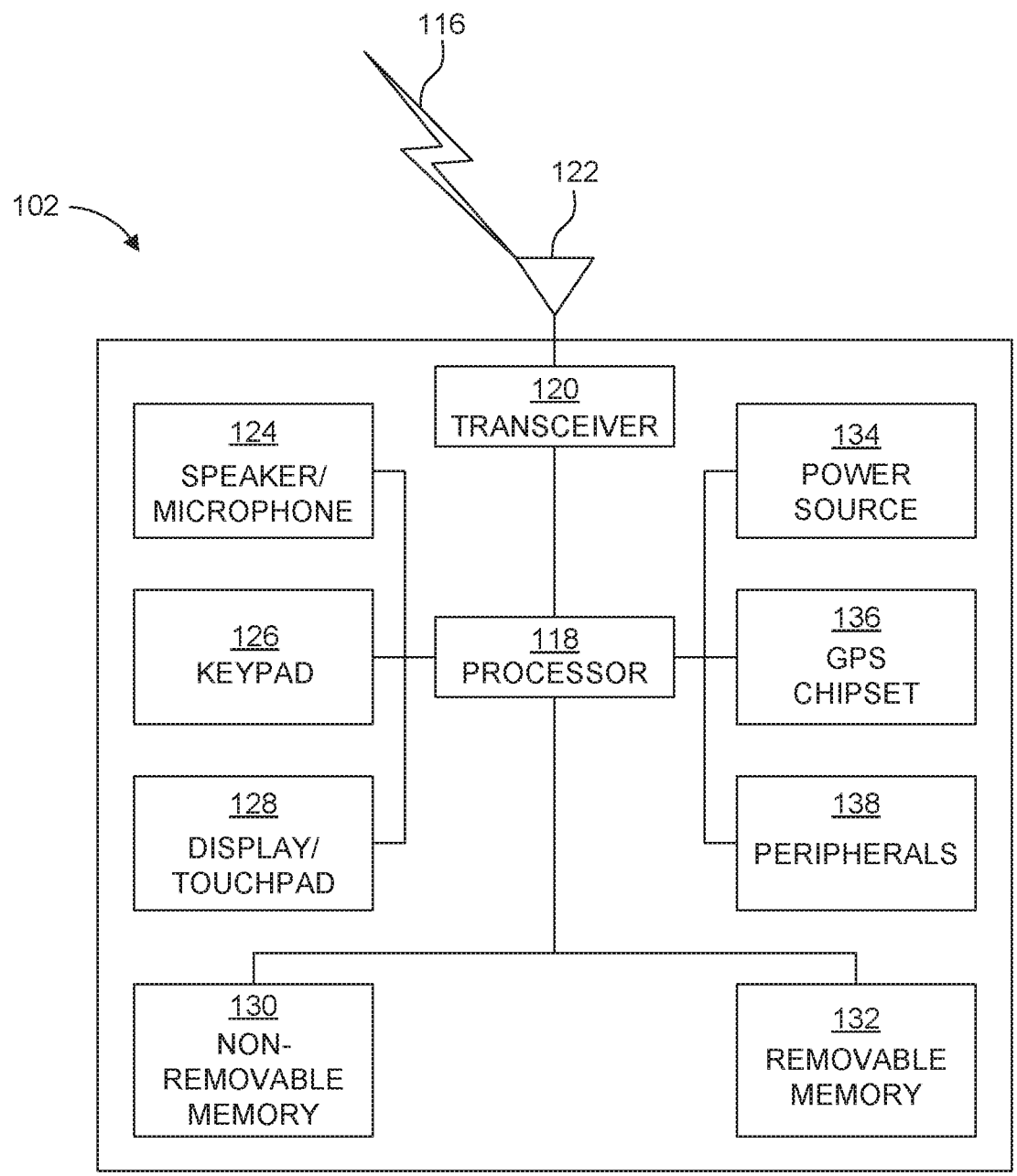
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
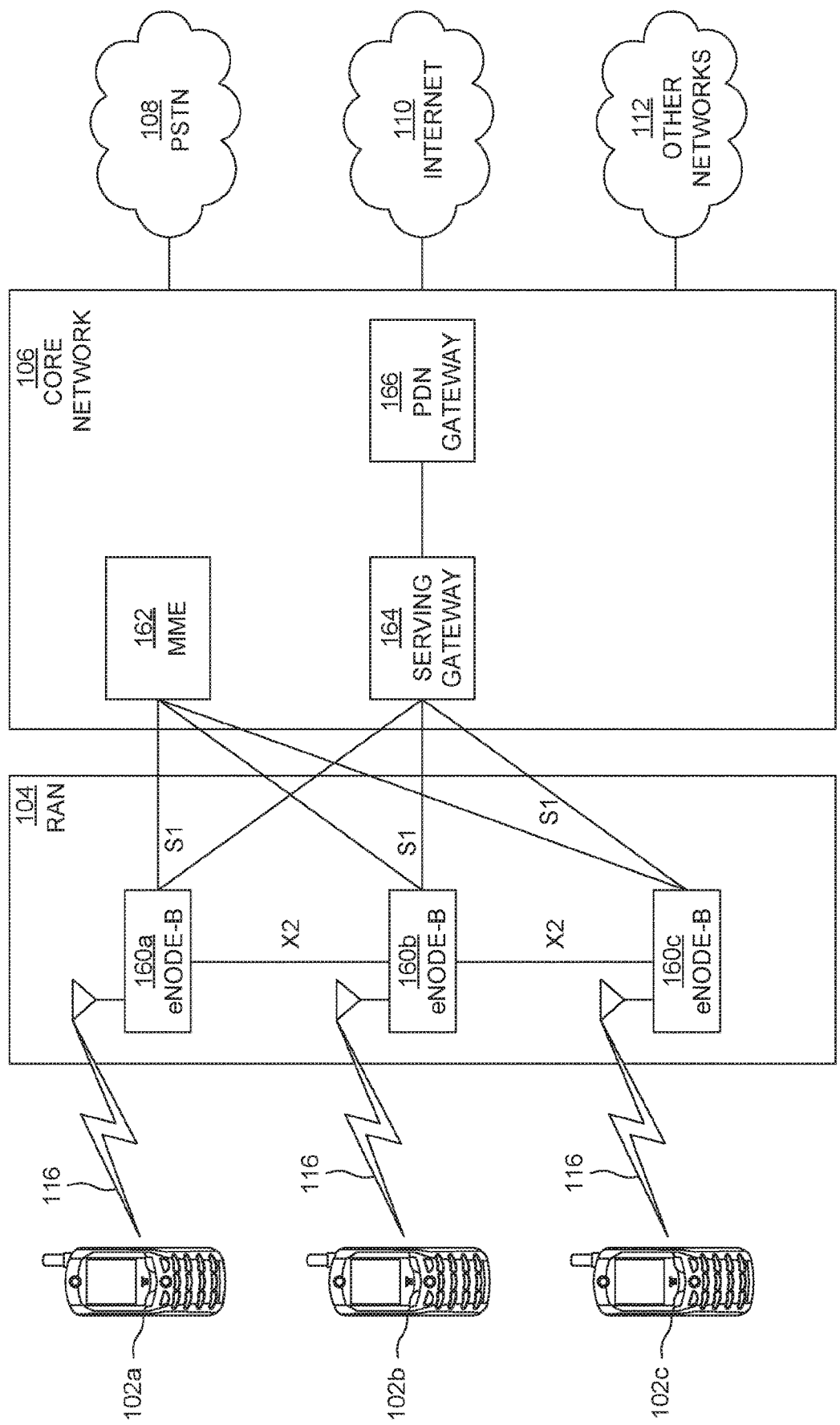
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
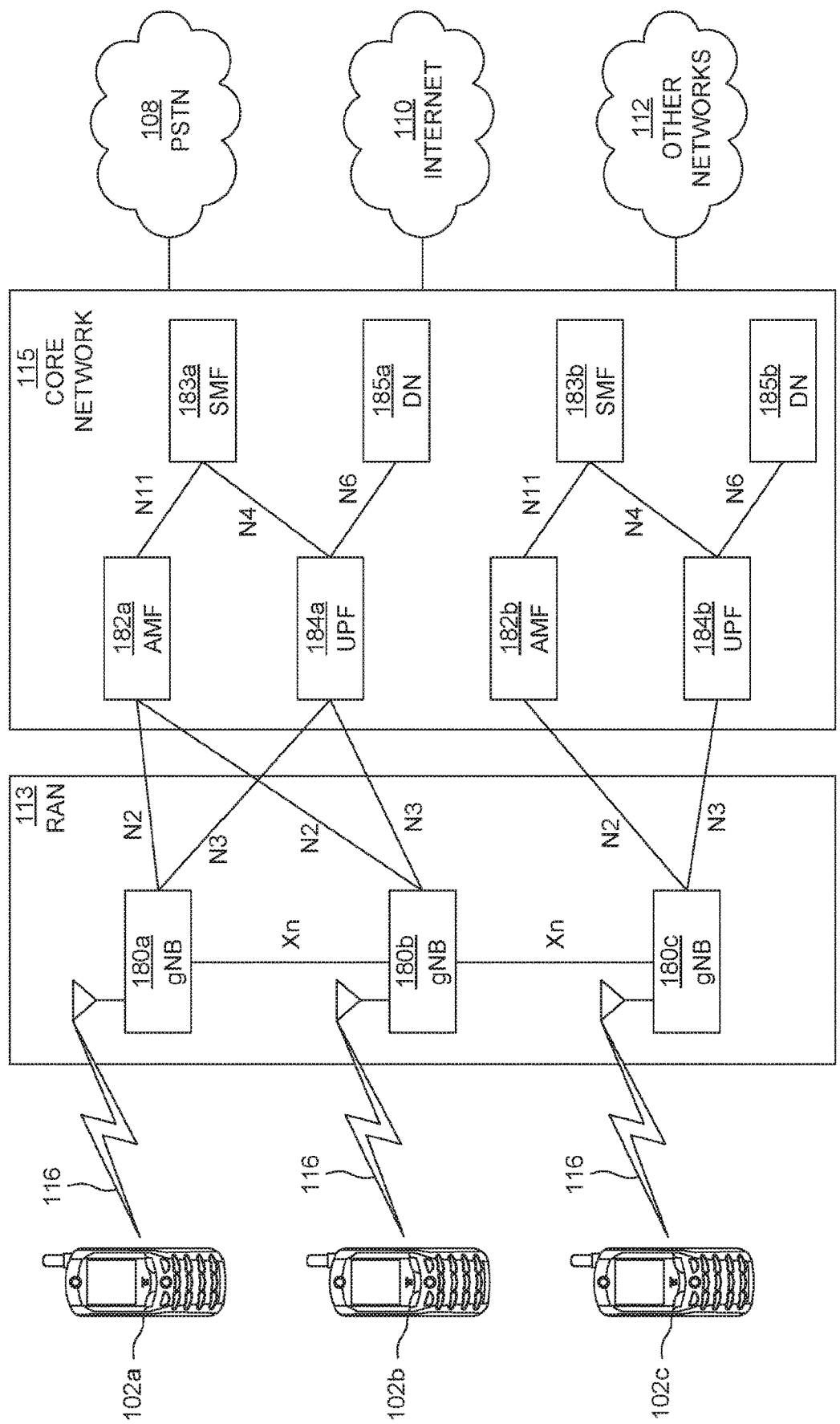
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Overview

As noted above, immersive displays have created a demand for realistic content in which a viewer can interact and navigate freely. Further, at the moment, typically only real-time rendered 3D (spatial) content enables full unlimited six degrees of freedom (6DoF) motion and interaction within such content. However, one issue with real-time 3D rendering is that realistic image quality can generally be achieved only with relatively simple scenes. For instance, the real-time 3D rendering may produce realistic visuals only with the simplest of scenes.

Off-line rendering can produce highly realistic images using advanced rendering approaches such as ray tracing. For example, off-line rendering may accurately simulate light transport between scene objects with different materials. One solution for enabling similar high-quality visualization for real-time applications is to use off-line rendering to produce light fields which enable interactive viewpoint manipulation, such as within a light field area. Typical light fields consist of only a single flat two-dimensional (2D) window from which light is captured, generally enabling only limited changes to the viewpoint. Furthermore, purely image-based approaches, in which a light field is represented as an array of RGB images approximating a four-dimensional (4D) light field, require data amounts that often prohibit a practical use. Also, an additional limitation of light fields is that they typically can only represent elements with pre-determined dynamic behaviors, thus limiting an applicability for interactive experiences.

One approach to reduce a sampling density required from a light field is to add 3D geometry information to accompany image information. The geometry information may be depth information enabling more accurate image warping between viewpoints included with the light field images, or the geometry information may be in the form of an explicit 3D mesh representing or approximating scene objects.

Another approach involves surface light fields. In general, surface light fields are a mix between pure image-based light fields and a traditional real-time 3D computer graphics. By providing 3D geometry to assist in image data re-mapping, surface light fields can result in, e.g., significant data optimization, while still providing image quality improvements similar to the light fields. Further, surface light fields generally operate by having accurate approximation of scene objects as 3D meshes to which multiple textures are mapped. Textures mapped to the geometry are light fields that contain surface appearance as a function of surface location and viewpoint direction. This type of surface light field reduces the amount of data, since much sparser image samples suffice as compared with purely image-based light fields. Surface light fields may also produce sharper rendering results than light fields alone. Furthermore, with a type of surface light fields that provide optimized proxy geometry approximating the original geometry, data amount reduction may be significant, enabling efficient realistic rendering of, e.g., very complex scenes on even low-end devices having mobile System on a Chip (SoC) processors.

Despite advantages in enabling practical light field rendering on mobile VR HMDs, current surface light field solutions typically provide limited support for interactive scene element behaviors, wider area navigation, and adaptability to varying client capabilities. As an example, freedom for 6DoF navigation can be normally supported only in a limited area. Similarly, only fully static scenes are normally supported.

Some embodiments described herein enable high image quality with a low-scene complexity and rendering cost similar to surface light fields while providing support for interactive dynamic content.

In general, in some embodiments, with light fields, the need for overlapping visual data from multiple viewpoints may be simplified by providing a 3D geometry information about a scene in addition to image data. In some embodiments, surface light fields can provide geometry, either a full original geometry or geometry proxies approximating the original geometry, to which light fields are mapped or projected, e.g., similar to normal texture mapping used with contemporary real-time 3D graphics. Typically, an exception to the texture mapping may be that instead of having a single texture that defines RGB colors along the geometry surface, surface light fields provide color information as a four-dimensional (4D) function, where in addition to a location on the surface, also a viewing angle determines color values.

Surface light fields normally require pre-processing, typically restricting their applicability to only static scenes without an interactive behavior. However, according to some embodiments, static scenes optimized and represented as surface light fields may be combined with real-time rendered content elements to provide dynamic and interactive elements. In some embodiments, full global light transport is reproduced for such hybrid scenes in real-time rendering.

In general, surface light fields can simplify client-side rendering of, e.g., virtual reality (VR) content streams. However, surface light fields typically allow for only limited interactivity. Various embodiments of the present disclosure improve interactivity (interactive behavior) by providing some scene elements in a full 3D asset format.

Further, various embodiments of the present disclosure enable content delivery in a hybrid format, where, for example, on per object basis, the content may be selectively provided in an optimized surface light field format or in a full 3D asset format. According to some embodiments, a content server estimates a format required by a viewing client, thus reducing data needed to be downloaded by the viewing client to, e.g., the minimum amount while still enabling interactive high-quality immersive rendering, even on low-end client devices.

In accordance with some embodiments, various solutions of the present disclosure enable a viewing client and a content server to collaborate on providing optimized distribution and balance between using surface light fields and real-time 3D assets in order to create highly realistic interactive immersive experiences even on viewing client devices with sub-optimal processing performance. More specifically, in some embodiments, the content server may provide a scene pre-processed into an optimized surface light field representation instead of full 3D assets, and when the viewing client executes an experience associated with the scene, the viewing client may selectively download any full 3D asset(s) for scene element(s) that the client wants to feature as having interactive dynamic behavior(s) and that hence could benefit from local rendering. Since, in such embodiments, the viewing client does not have the full scene in an original 3D format, the client will not normally be able to estimate locally what other scene elements are visually impacted by the interactive dynamic behavior(s) in the scene.

In some embodiments, an immersive 3D scene may be streamed to a client device from a server. Some scene elements may be streamed in a surface light field format, and other scene elements mat be streamed in a full 3D (asset) format (e.g. a 3D mesh plus texture). The client device may report interactivity (interactive behavior) to the server, and the server may, in turn, determine which scene element(s) to send in which particular format. For example, the server may determine that an interaction with a first object (e.g., an object A) that has a dynamic behavior requires sending a second object (e.g., an object B) in a full 3D asset format because the reflection of the object A interacts with the object B, by for example, being visible in the object B.

Figure 2:
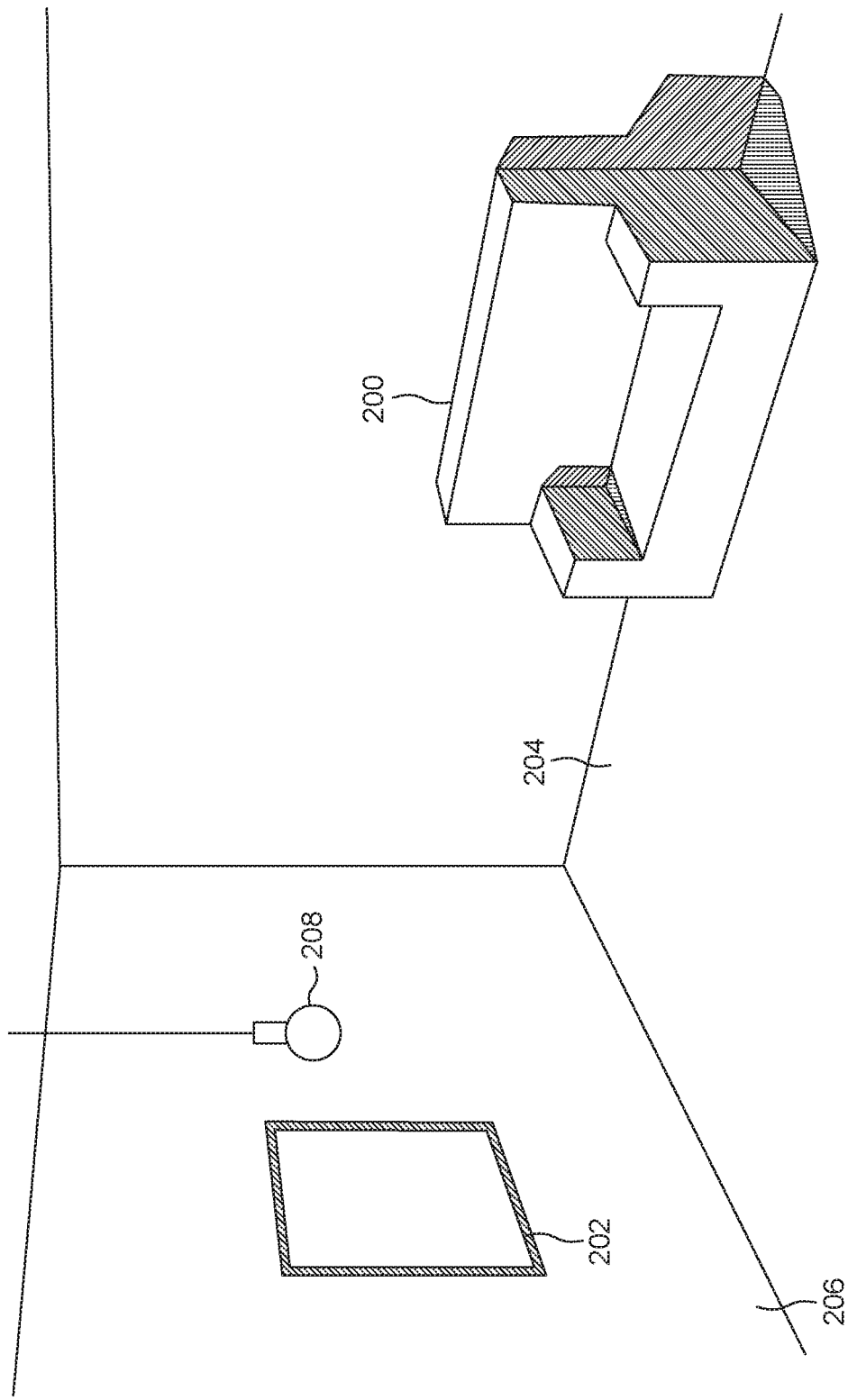
FIG. 2 illustrates an example of a static scene, according to some embodiments.

To illustrate, FIG. 2 shows an example of a static scene, according to some embodiments. The scene illustrated in FIG. 2 represents an example of a static scene which can be, e.g., fully delivered using a surface light field format. By way of example, as shown in FIG. 2, the static scene may include such static (scene) elements as an element (a couch) 200, an element (a wall mirror) 202, an element (a floor) 204, an element 206 (a wall), and an element 208 (a hanging light) FIG. 3 then illustrates an example of an addition of a dynamic interactive element to the example scene of FIG. 2, according to some embodiments.

Figure 3:
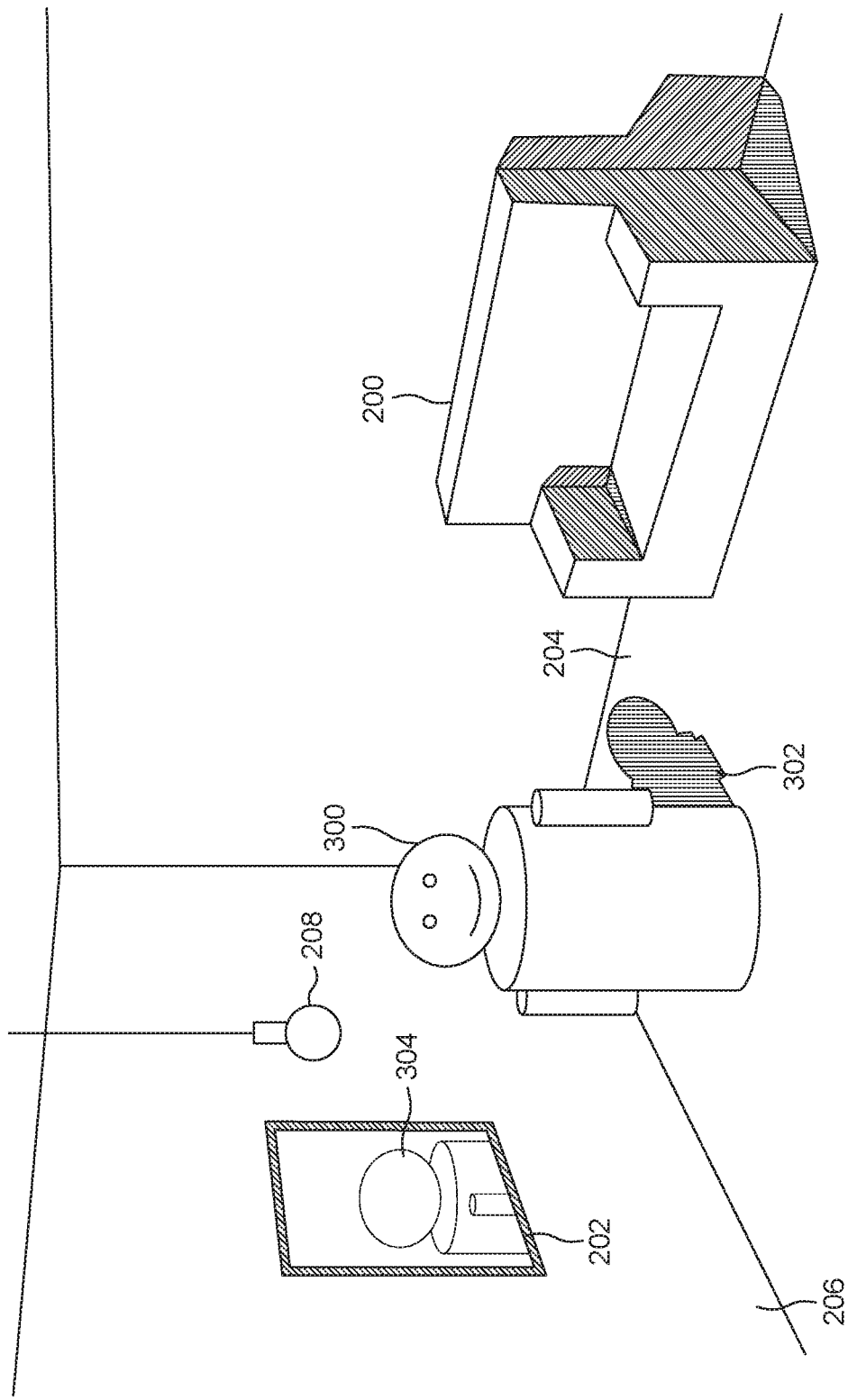
FIG. 3 illustrates an example of an addition of a dynamic interactive element to the example scene of FIG. 2, according to some embodiments.

Referring to FIG. 3, when a client adds a dynamic interactive (scene) element 300 to the scene shown in FIG. 2, in this case a robot with a smile 300, in some embodiments, the client first requests a robot asset from a content server in an original full 3D format, so that the client locally renders the asset in real-time. Such client-side rendering may enable real-time interactive behaviors without network latency that would be caused by server-side rendering. However, since the client does not have the full scene in an original 3D format, the client may not able to determine visual impact(s) that the addition of the dynamic interactive element 300 rendered locally on the client may cause to the rest of the scene.

The example in FIG. 3 illustrates examples of visual impacts on the rest of scene elements, e.g., the elements 200-208, that may be caused by a locally rendered dynamic behavior, in this case the smiling robot 300, in order to maintain a visual integrity of the scene. In this example case, as shown in FIG. 3, visual impacts include a shadow 302 cast by the robot 300 onto the floor 204 and a reflection 304 of the robot 300 in the mirror 202 on the wall 206.

Figure 4:
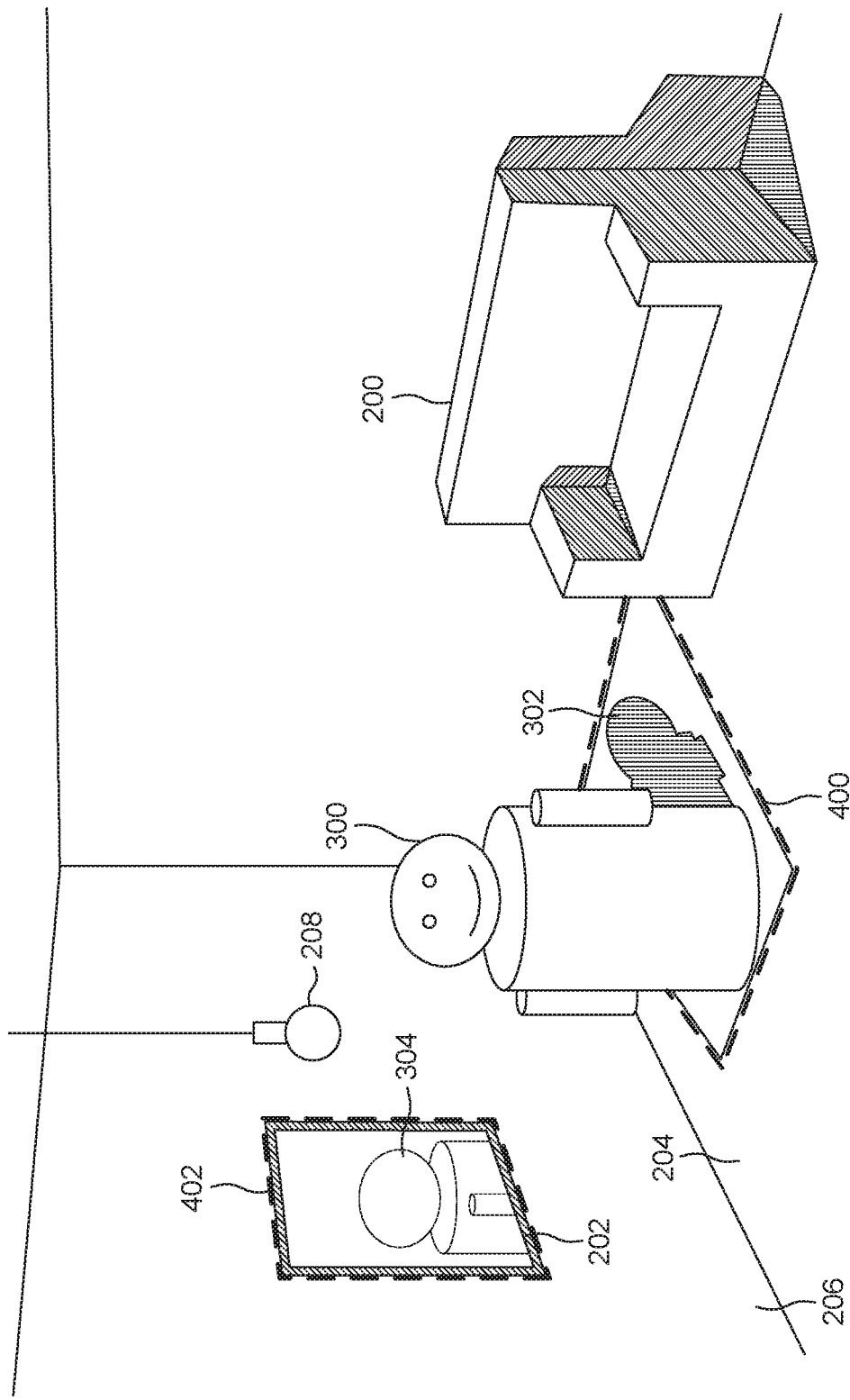
FIG. 4 illustrates an example of invalid surface light field areas of the static scene of FIG. 2 after the addition of the dynamic interactive element of FIG. 3, in accordance with some embodiments.

In some embodiments, to correctly handle those visual impacts, the content server determines area(s) of the scene where original surface light fields representing the scene (and provided by the server to the client, as explained above) have become invalid due to the addition of the dynamic interactive element(s) 300 and signals that information back to the client. FIG. 4 illustrates an example of invalid surface light field areas of the static scene of FIG. 2 after the addition of the dynamic interactive element 300 of FIG. 3, according to some embodiments.

More specifically, in FIG. 4, elements 400 and 402 denoted by bolded and dashed lines (e.g., an area containing a shadow of the robot (400) and an area enclosing the wall mirror (402)) are examples of the areas originally represented by surface lights fields that have become invalid in the static scene after the addition of the smiling robot element 300. As shown in the example of FIG. 4 and noted above, those impacted static-scene elements include a portion of the floor 204 onto which the shadow 302 of the robot 300 is cast and the wall mirror 202 that now includes the reflection 304 of the robot 300.

In some embodiments, the client may acquire full 3D format assets corresponding to the scene elements (in this example case, the wall mirror 202 and the floor 204) that are visually impacted (by the addition of the interactive element 300) from the content server and render those assets locally, thus being able to produce or render the visual impacts correctly. Further, in some embodiments, the content server itself may also assist in rendering of the visual impacts or may maintain multiple versions of pre-produced surface light fields (or, more specifically, surface light field representations of elements) which can be subsequently switched between during run-time based on state(s) of dynamic element(s).

According to some embodiments, the (viewing) client may signal local dynamic behaviors back to the content server, which in turn may estimate which parts of the static scene are impacted by the dynamic behavior(s) based on the original full 3D scene information. The server may then signal element(s) impacted back to the client, so that the client can download the impacted scene elements as full 3D assets and render them locally in order to have the whole scene reflect dynamic behaviors correctly.

To illustrate, in the context of the examples shown in FIGS. 3-4, the client may signal an indication of a dynamic behavior of the robot 300 (the dynamic interactive element), while in turn, the server may estimate which parts of the static scene, as shown in FIG. 2, are impacted by the dynamic behavior(s) of the robot 300 based on the original full 3D scene information. In this example, the server may determine that the portion of the floor 204 onto which the shadow 302 of the robot 300 is cast and the wall mirror 202 (that now includes the reflection 304 of the robot 300) are impacted. Subsequently, the server may then signal information defining the impacted element(s) back to the client (in this case, the wall mirror 202 and the floor 204) defined as full 3D assets. Accordingly, the client can render those elements defined in the 3D asset format locally in order to have the whole scene reflect dynamic behaviors correctly.

With a benefit of the above approach, the client does not need to download the full scene in a 3D format, but instead may need, e.g., only a minimal amount of data in the original 3D format and a minimal amount of real-time rendering while still being able to provide interactive dynamic behaviors. Furthermore, in some selected embodiments, the client may observe performance metrics and, based on the observed metrics, restrict possibilities for user interaction accordingly to avoid a need for local real-time 3D rendering that would exceed 3D rendering performance of a viewing device.

Further, in accordance with various embodiments of the present disclosure, a client device (including, e.g., a viewing client as described above) may receive, from a server (e.g., a content sever), surface light field representations a plurality of scene elements in a 3D scene, including a first scene element. The client device may subsequently provide to the server an indication of a dynamic behavior of a second scene element different from the first scene element. For example, during a viewing experience, the client device may add a dynamic interactive scene element to the scene, while the first scene element remains static. In response to the indication, the client device may receive from the server information defining the first scene element in a 3D asset format. Accordingly, the client device may render at least the first scene element in the 3D asset format. Accordingly, in some embodiments, a viewing client on the client device (e.g., a virtual reality (VR) client) may receive 3D scene data in a surface light field format (which, e.g., may be easier to render), but then the server may switch to providing assets in a full 3D format where needed to render scenes dynamically.

In some embodiments, a viewing client (e.g., client) reports interactivity to a server, and the client receives VR scene elements from the server as either 3D assets or surface light fields.

In some embodiments, a server (e.g., a VR server) receives interactivity reports from a client and provides VR scene elements as 3D assets when required by interactivity or as surface light fields otherwise. Further, in some embodiments, the server updates some of the surface light fields in view of interactivity. Yet further, in some embodiments, the server uses predefined surface light fields to allow for interactivity.

In some embodiments, scene elements represent different 3D objects (or different portions of a 3D object) within a scene. Scene elements may be nodes of a scene graph describing the scene.

In some embodiments, surface light field data for a scene element, such as a 3D object, includes (i) mesh data describing a surface geometry and (ii) light field texture data. For each of a plurality of points on the surface, the light field texture data indicates a color (e.g. a radiance, an RGB value, or an RGBA value) for each of a plurality of directions from the respective point. In some embodiments, data for a scene element in a non-light-field 3D format includes (i) mesh data describing a surface geometry and (ii) non-directional texture data. The non-directional texture data indicates a color (e.g. an RGB value or RGBA value) for the respective point. Data for a scene element in a non-light-field 3D format may further include information on reflectance and/or reflectivity of portions of the scene element or portions thereof (e.g. a bidirectional reflectance distribution function (BRDF)).

In some cases, the mesh data used in a surface light field representation of a scene element may be the same as the mesh data used in a non-light-field representation of the element. In other cases, the mesh data may be different. For example, the mesh data used in the surface light field representation may be simpler (e.g. may have fewer polygons and/or vertices) than the mesh data used in the non-light-field 3D format.

In some embodiments, a client device operates to determine, for a scene element within a 3D scene, whether the scene element is dynamic (e.g. is changing in position or appearance). In response to a determination that the scene element is dynamic, the client device retrieves the scene element from a content server in a non-light-field format. In response to a determination that the scene element is not dynamic, the client device retrieves the scene element from a content server in a surface-light-field format. The same determination may be made for a plurality of scene elements. The retrieved scene elements may be rendered by the client device. In some embodiments, the client device reports dynamic behavior of at least a first scene element (e.g. a change in position) to the content server, and the content server identifies to the client any additional scene elements that have become dynamic because of the dynamic behavior of the first scene element (e.g. scene elements that change in position or orientation due to motion of the first scene element, or scene elements with shadowing or lighting that is changed due to dynamic behavior of the first scene element). In some embodiments, a determination of whether to retrieve a scene element in a surface-light-field format or non-light-field format may be based at least in part on processing resources available to the client device; the number of scene elements retrieved in non-light-field format may be limited when client processing resources are limited.

Brief Summary of Example Processes and Entities

In some embodiments, an example process described above may involve (1) pre-processing stage executed by a content server, (2) a run-time stage executed by a content server, (3) and an execution stage performed by a viewing client.

More specifically, as explained above, surface light fields typically use pre-processing for producing static scene representation. In some embodiments, example pre-processing executed by a content server may involve, without limitation, a series of steps including the following: (1) receiving a full 3D scene; (2) producing a surface light field representation of the scene; and (3) storing the full 3D scene, surface light field representation, and a corresponding scene meta-data.

In some embodiments, an example run-time process executed by the content server may involve, without limitation, a series of steps including the following: (1) waiting for content requests from a viewing client; (2) providing the scene meta-data, the surface light fields and assets in an original full 3D format based on the client request; (3) receiving signaling from the viewing client indicating (i) which area(s) in the scene experience dynamic behavior(s), (ii) a current client viewpoint; (4) estimating area(s) visually impacted by the dynamic behavior(s) signaled by the viewing client; and (5) signaling 3D model(s) of content in the impacted areas to the viewing client.

In some embodiments, example process executed by the viewing client may involve, without limitation, a series of steps including the following: (1) requesting content from the content server; (2) receiving the scene meta-data from the content server; (3) downloading the scene in surface light field representation; (4) downloading locally rendered/ interactive assets in a full 3D format; (5) processing user input and execute scene logic; (6) signaling a current viewpoint and dynamic behavior(s) of the scene to the content server; (7) receiving content server estimation of the visually impacted scene element(s); (8) downloading visually impacted element(s) in the full 3D format; (9) rendering the surface light field representation and the full 3D asset(s) as a combination; (10) observing performance metrics; (11) if needed, limiting element(s) that can have dynamic behavior; and (12) if end of session is not requested, returning to the step (4) of the client-side process.

Various processing stages are described in more detail below.

Advantageously, various embodiments of the present disclosure, may enable high-quality immersive interactive rendering on devices with, e.g., sub-optimal performance capabilities. Some benefits of embodiments disclosed herein include an ability to support dynamic content with, for example, minimal data and processing required by a client device and an ability for the client device to dynamically adjust user interactions so that local processing required by dynamic behavior(s) can be achieved with local computing performance.

Example System Arrangement and Detailed Operation

Figure 5:
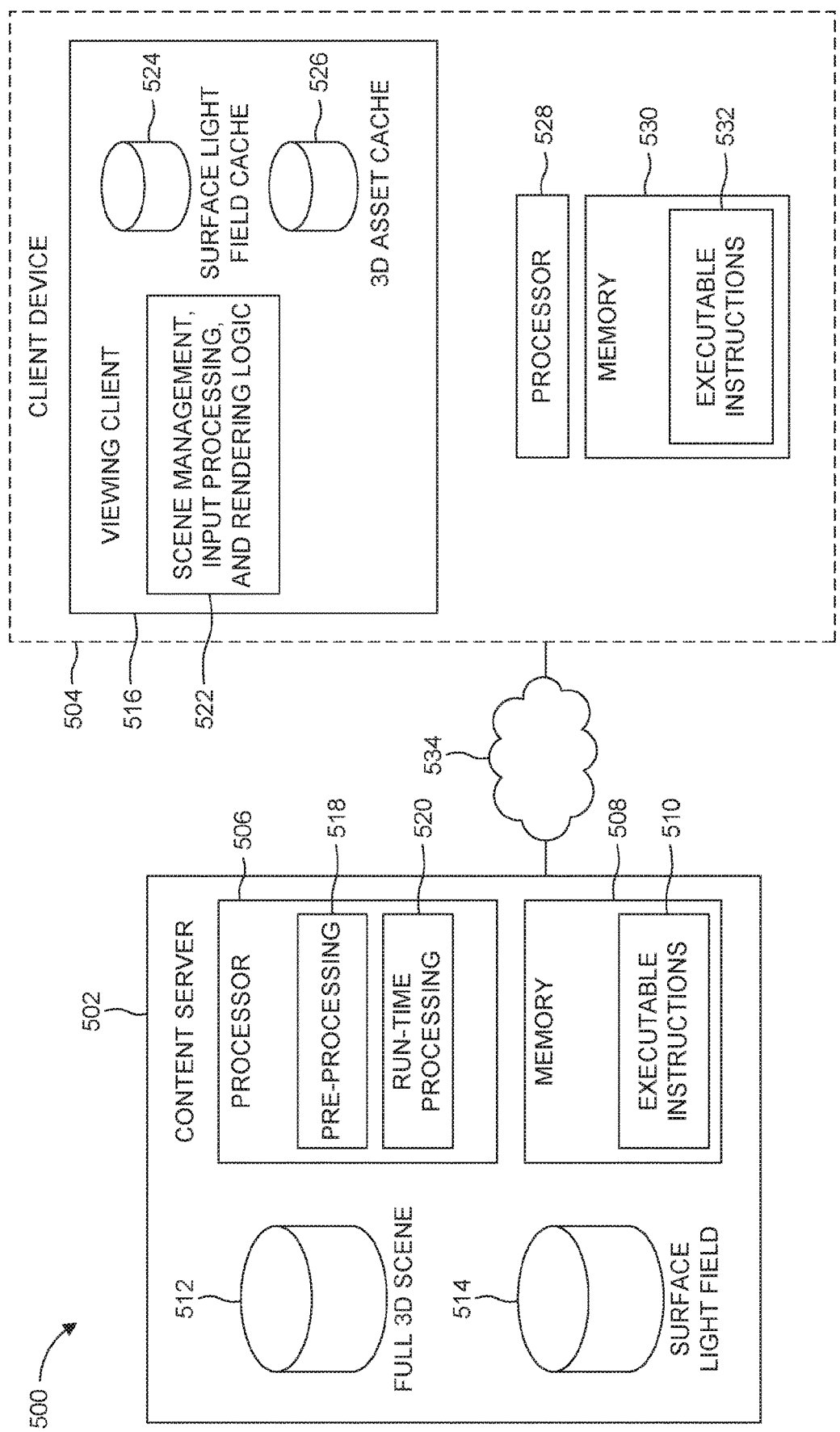
FIG. 5 is a block diagram of an example of a system arrangement in which example embodiments of the present disclosure may be carried out.

FIG. 5 is a block diagram of an example of a system arrangement 500 in which example embodiments of the present disclosure may be carried out.

As shown in FIG. 5, the example system arrangement 500 includes a content server 502 (e.g., a virtual reality (VR) server) that may serve content requested by a client device 504. The server 502 may include a first processor 506 and a first non-transitory computer-readable memory 508 containing a plurality of instructions 510 that are executable by the processor to carry out embodiments of various methods disclosed herein. For example, the executable instructions 510 may define program logic for pre-processing 518 that may be executed by the first processor 506 and may define logic for run-time processing 520 that may be executed by the first processor 506 (as noted above). Although not explicitly shown, the first processor 506 and the first memory 508 may be interconnected via a bus or a similar mechanism. As shown, the content server 502 may also contain or be coupled to a database 512 holding, e.g., scene(s) in a full 3D format (denoted as a "full 3D scene"). Further, the content server may also contain or be coupled to a database 514 holding, e.g., surface light filed representations of elements in the 3D scene (denoted as "surface light fields"). In some embodiments, surface light field data is produced by the content server 502.

The content server 502 and the client device may 504 be coupled to each other for communication via any suitable wired and/or wireless network(s) 534, such as the Internet and/or other networks. The client device 504 may include a viewing client 516 that, in some embodiments, may be a stand-alone application or may be integrated with another application run by the client device 504. As shown, the viewing client 516 may include one or more modules 522 (e.g., program logic in the form of processor-executable instructions) for providing scene management, input processing, and rendering. The client device 504 may also include a second processor 528 and a second non-transitory computer-readable memory 530 containing a plurality of instructions 532 that are executable by the client device 504 to carry out embodiments of various methods disclosed herein. Although not explicitly shown, the second processor 528 and the second memory 530 may be interconnected via a bus or a similar mechanism. As further shown, the client device 504 may also contain a surface light field cache 532 (e.g., for storing surface light field element representation(s), e.g., received from the server 502) or a 3D asset cache (e.g., for storing information defining element(s) in a 3D asset format), e.g., received from the server 502. Although not explicitly shown, coupled to the viewing client may be any suitable tracking and input means for receiving user inputs, navigation, etc. and a display that displays content rendered by the viewing client to a user.

Note that various entities shown in FIG. 5 may be coupled to each other via any suitable wired and/or wireless links and/or other intermediate elements now shown.

Figure 6:
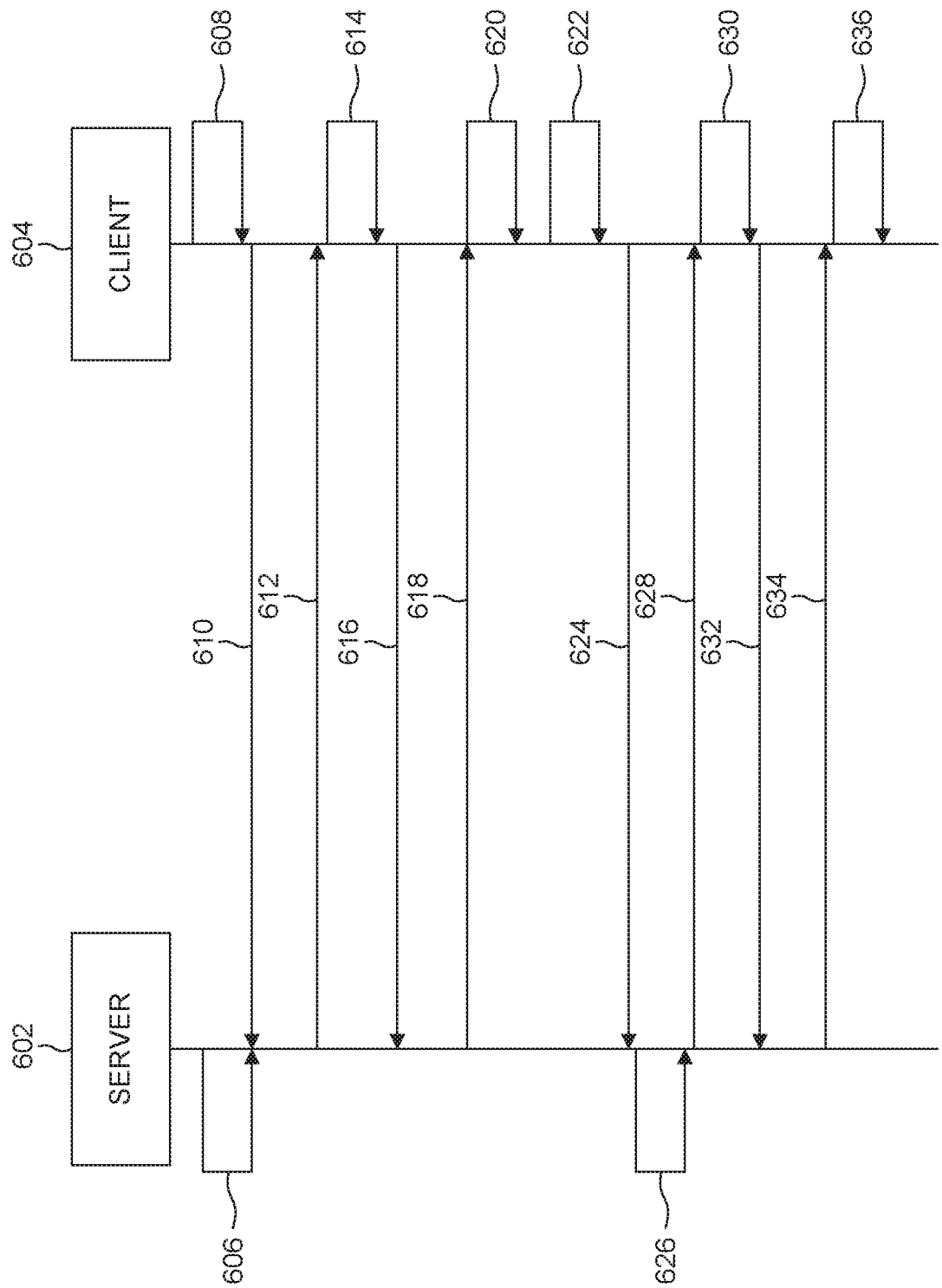
FIG. 6 illustrates an example message sequence diagram, in accordance with some embodiments.

FIG. 6 illustrates an example message sequence diagram 600, in accordance with some embodiments. The example message exchange shown in FIG. 6 takes place between a server 602 and a client 604.

As shown in FIG. 6, initially, at 606, the server 602 may produce surface light fields for 3D scene elements (or elements in a 3D scene). On the other hand, at 608, the client 604 may initially collect sensor and configuration data. Subsequently, at 610, the client 604 may request content, from the server, that corresponds to the 3D scene.

In response, at 612, the server 602 may first provide scene description meta-data to the client 604. Based on the received scene description meta-data, at 614, the client 604 may determine, for instance, on a per-element basis, element formats to be requested from the server 602. As shown, the client 604 may then, at 616, request from the server element(s) to be represented by surface light fields and element(s) corresponding to assets in a full 3D format.

At 618, after a receipt of the requested scene elements, the client 604 may process sensor data and user input at 620. Further, at 622, the client 604 may execute scene logic (contained in the scene description meta-data) and update a viewpoint. Next, at 624, the client 604 may signal dynamic behavior(s) of scene element(s), together with the updated viewpoint, back to the server 602. In response, at 626, the server may evaluate one or more elements impacted by dynamic behavior(s) and, at 628, signal those impacted element(s) back to the client 604. In turn, at 630, the client 604 may request from the server 602 the impacted element(s) in a full 3D asset format, e.g., may send a request at 632 to request asset(s) corresponding to those impacted elements(s) in a full 3D format, as shown in FIG. 6

Furthermore, in response to the client request, the server 302 may provide the requested asset(s) in the full 3D format to the client at 634. Subsequently, at 636, the client may render a combination of surface light fields and 3D assets. The client may also observe performance metric(s) during content execution, and limit interaction if so indicated by the metric(s).

Figure 7:
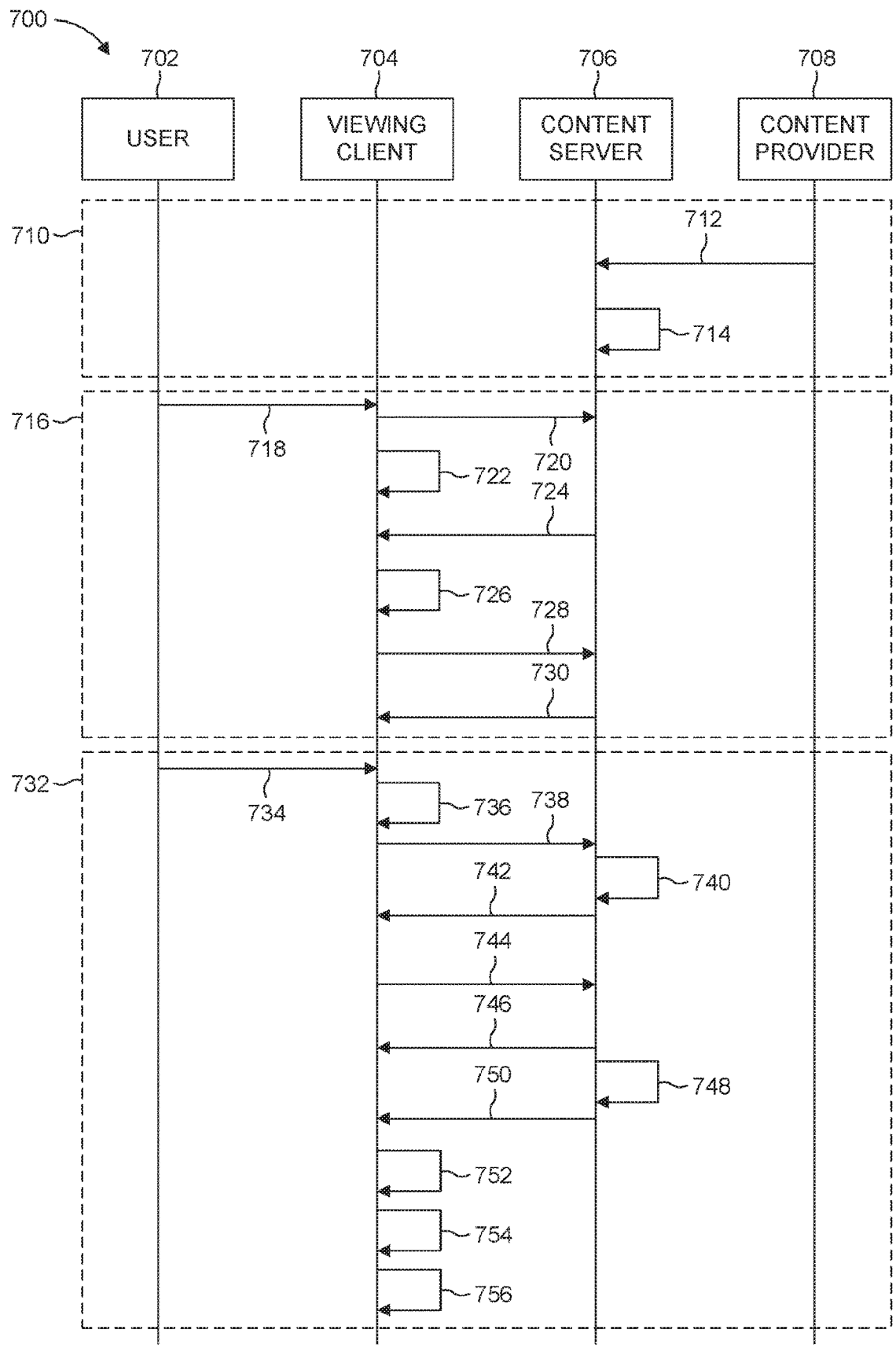
FIG. 7 illustrates an example message sequence diagram in more detail, in accordance with some embodiments.

FIG. 7 illustrates an example message sequence diagram 700 in more detail, in accordance with some embodiments. In some embodiments, a sequence of communication between entities shown in FIG. 7 may occur in a typical use session. Accordingly, as shown by way of example in FIG. 7, the typical use session may involve interactions among a user 702, a viewing client 704, a content server 706, and a content provider 708.

Among various functions illustrated in FIG. 7, in some embodiments, at the beginning of a session, a viewing client 704 downloads scene meta-data describing, for example, scene elements, surface light field geometry and asset correspondence, and scene logic. Using the scene meta-data the viewing client 704 may then optimize download and client-side processing. In some embodiments, the client optimizes the download by choosing to download in an original full 3D format only those assets corresponding to scene elements that the viewing client wants to feature as having an interactive dynamic behavior. Further, in some embodiments, when executing a 3D scene experience, the viewing client signals interactive dynamic behavior(s) back to the content server. In turn, the content server, having full 3D scene information may then determine which area(s) of the full scene are impacted by the interactive behavior(s) and signal that information back to the viewing client. Accordingly, in some embodiments, the viewing client does not need to have the full 3D scene while being aware of what area(s) are impacted by the interactive behavior(s), e.g., know the area(s) of the full scene that display visual changes due to the interactive element(s).

More specifically, referring to FIG. 7, during a content pre-processing stage 710, at 712, the content provider 708 may provide an original 3D scene and a navigation area (both in any suitable format) to the content server 706. The 3D scene may include multiple scene elements. In turn, at 714, the content server 714 may produce surface light fields for a selected viewing area, such as surface light field representations of scene elements within the viewing area. This may complete the content pre-processing stage 710.

During the following content distribution stage 716, a message exchange may take place between the user 702, the viewing client 704, and the content server 706. In particular, at 718, the user 702 may submit a content request to the viewing client 704 via any suitable interaction with the viewing client 704. At 720, the viewing client 704 may pass the content request to the content server 706. Further, at 722, the viewing client 704 may collect sensor and configuration data. In return, at 724, the content server may provide scene description meta-data to the viewing client 704. As noted above, using the scene meta-data the viewing client 704 may then optimize download and client-side processing. For instance, in the example of FIG. 7, at 726, the viewing client may select an initial viewpoint and scene element(s) to be rendered locally. Accordingly, at 728, the viewing client 704 may request, from the content server 706, surface light fields (surface light field representations) for some selected element(s) (e.g., static element(s)) and full 3D assets for other element(s) (e.g., only those assets corresponding to scene element(s) that the viewing client 704 wants to feature/ render locally as having an interactive dynamic behavior). At 730, the content server may serve the requested surface light fields and full 3D assets to the viewing client 704.

Subsequently, during a run-time (loop) stage 732, at 734, the user 702 may provide a user input to the viewing client 704. At 736, the viewing client 704 may process user input and scene logic, and update a viewpoint accordingly. At 738, when executing a 3D scene experience for instance, the viewing client 704 may signal an indication of (interactive) dynamic behavior(s) (e.g., an indication of a dynamic behavior of one or more scene elements and a viewpoint back to the content server 706. In response, at 740, the content server 706, having, e.g., full 3D scene information may then evaluate which area(s) of the full scene are impacted by the interactive behavior(s)/dynamic elements(s), and signal that information back to the viewing client 704, at 742, by providing an indication of assets impacted by the dynamic element(s). In response, at 744, the viewing client 704 may send a request for certain 3D assets to be rendered locally. Accordingly, as noted above, the viewing client 704 does not need to have the full 3D scene while being aware of what area(s) are impacted by the interactive behavior(s), e.g., knowing the area(s) of the full scene that display visual changes due to the interactive element(s).

Then, at 746, the content server 706 may provide the requested 3D assets. Also, at 748, the content server may update surface light fields and, at 750, send the updated surface light fields to the viewing client 704. As a result, at 752, the viewing client 704 may render a combination of the surface lights fields and 3D assets available at the viewing client 704. Additionally, in some embodiments, the viewing client, at 754, may observe QoE (Quality of Experience) metrics and, and 756, restrict dynamic behavior of the scene according to (or based on) the observed QoE metrics. Note that the run-time (loop) stage may 732 may be "looped" (iteratively repeated) throughout a 3D-scene viewing experience of the user 702.

Various processing steps of embodiments disclosed hereinabove are described in more detail below.

Content Server Pre-Processing

Figure 8:
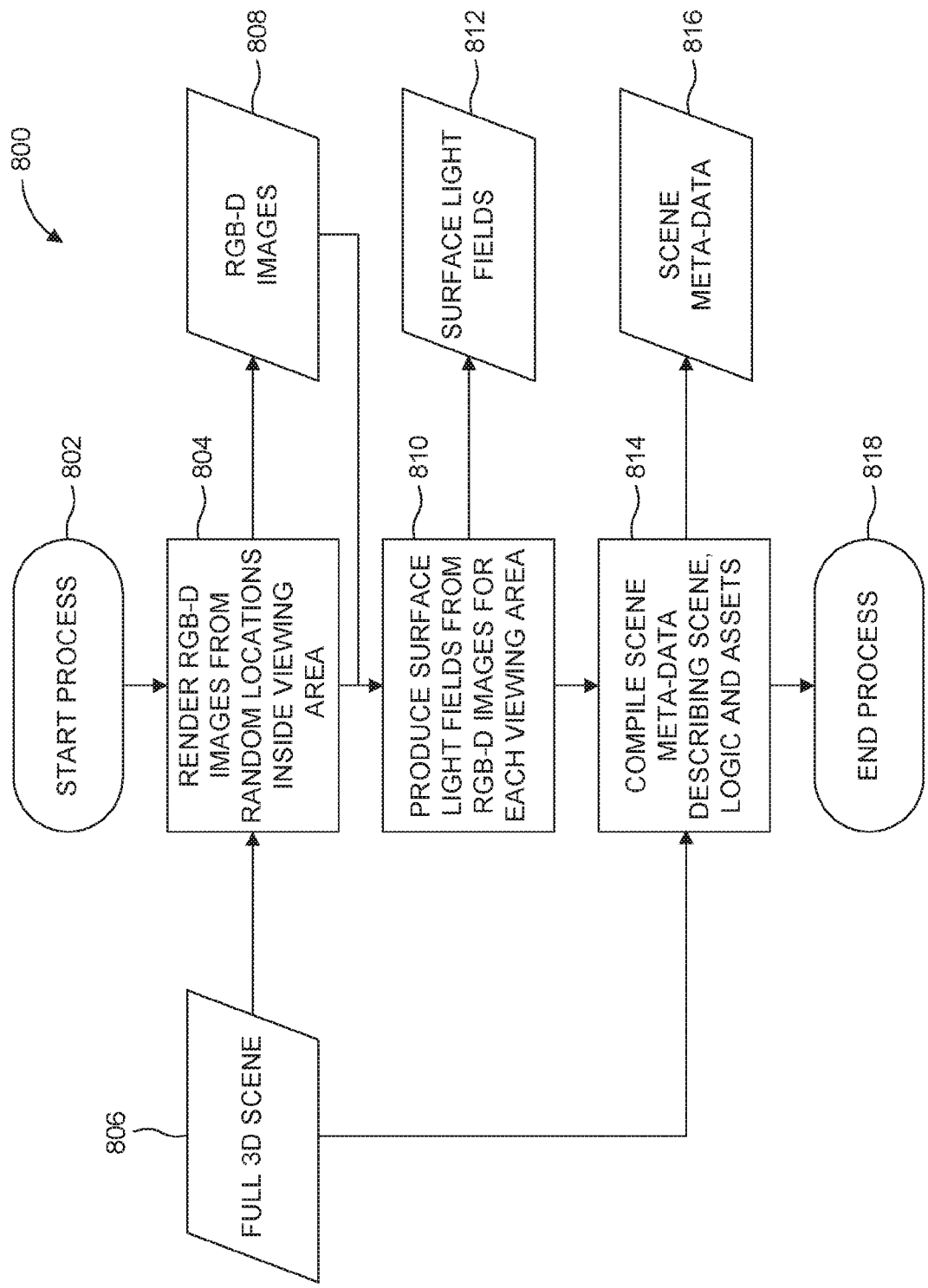
FIG. 8 is a flow chart illustrating an example pre-processing of content executed by a content server, according to some embodiments.

FIG. 8 is a flow chart 800 illustrating an example pre-processing of content executed by a content server, according to some embodiments. As a general matter, in the pre-processing stage, in some embodiments, the content server may produce surface light fields for assets of an original full 3D scene.

Referring to FIG. 8, the process starts at step 802, when a full 3D scene is uploaded to the content server for distribution. Uploaded information may contain, for example, all scene assets, a scene graph describing the scene structure and scene logic describing interactive behavior(s) of the scene. In some embodiments, surface light fields may support only a limited viewing volume, so a content provider uploading the full 3D scene to the content server may also determine a viewing area for which a surface light field representation is to be created. The content server may store, at step 806, data corresponding to the full 3D scene for subsequent processing.

At step 804, the optimized scene geometry representation suitable for surface light field representation of the 3D scene may be produced using Seurat or any other suitable tool. Namely, at 804, the content server renders RGB-D images (that, at step 808, may be stored at the content server for further processing) from random locations inside the viewing area (e.g., for which a surface light field representation is to be created, as noted above). In general, Seurat uses several RGB-D images from random locations within a selected viewing volume from which it produces optimized geometry representation of a given scene. Such optimized representation can feature view-dependent shading effect by some form of surface light fields.

At step 810, the content server produces surface lights fields (that, at step 812, may be stored at the content server for further processing) from the RGB-D images for each viewing area. In some embodiments, using a suitable light field creation tool, surface light field representation is only produced for static element(s) and element(s) with pre-determined dynamic behavior(s), scene element(s) that are intended to feature client-controlled dynamic behaviors are omitted or recorded as part of the surface light field in their scene start-up state. In addition to creating a surface light field representation, in some embodiments, the content server also records a correspondence between original 3D assets and resulting surface light field geometry. The correspondence information may be stored along with scene meta-data and, in some embodiments, used by a client in order to remove surface light field element(s) being rendered using full 3D asset(s).

As shown in FIG. 8, at step 814, based on the full 3D scene data, the content server compiles various information, including scene meta-data describing the scene, (scene) logic, and assets, e.g., associated with scene elements. The scene-meta data held at the content server (step 816) may include a link to the surface light field data, scene graph describing hierarchical relationships between scene elements (e.g., assets with links to the actual asset data), scene logic (e.g., behavior of assets in terms of relationship with other assets), timeline, user input, a correspondence between the surface light field geometry and assets, and/or the like. Subsequently, the example pre-processing of content executed by the content server may terminate at step 818.

Example Content Server Run-Time Processing

Figure 9:
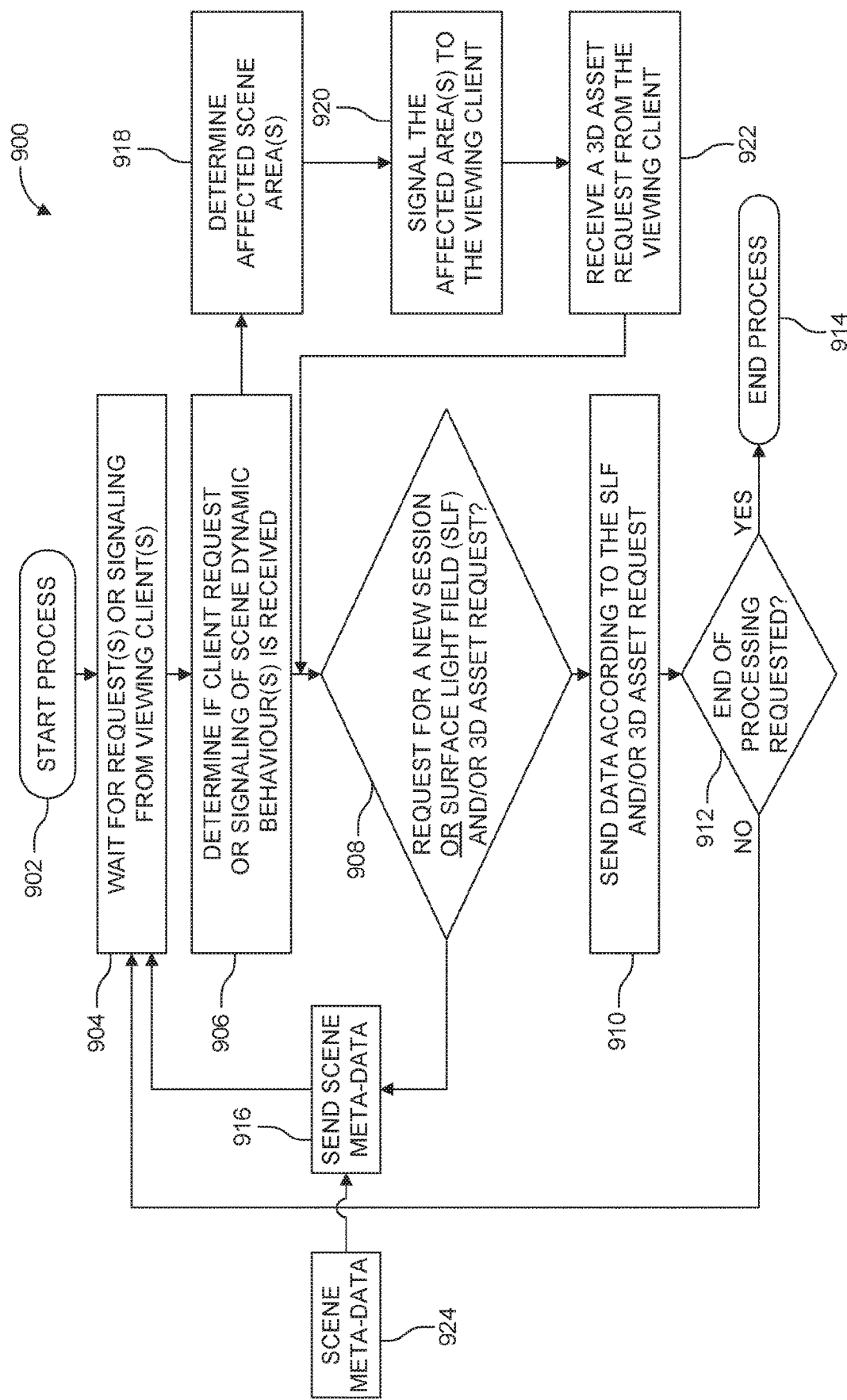
FIG. 9 is a flow chart illustrating an example run-time processing executed by a content server, in accordance with some embodiments.

Once the content server has performed pre-processing of the 3D scene, the content server may start run-time processing during which it distributes content for viewing clients (or content distribution stage, as illustrated in the example of FIG. 7). FIG. 9 is a flow chart 900 illustrating an example run-time processing executed by a content server, in accordance with some embodiments.

In general, when a viewing client starts a new session, the client may first request and download scene meta-data from the content server. Based on the scene meta-data, the viewing client may then request and download scene 3D assets and surface light fields, as needed. More specifically, in some embodiments, when the viewing client is executing the session, the client may process scene logic locally based on local context and user input. As described above, the scene logic may be provided to the viewing client by the content server as a part of the scene meta-data. As the client executes the scene logic, interactive element(s) of the scene may be accordingly updated locally on the client side. In some embodiments, the client signals the interactive dynamic behavior(s) of the locally-processed scene elements back to the content server. Based on the signaled information, the content server that has full 3D scene data may be able to estimate (e.g., resolve) scene area(s) that are visually impacted (affected) by the interactive dynamic behavior(s) indicated by the client. Further, in some embodiments, in addition to the interactive dynamic behavior(s), the viewing client signals a current viewpoint to the content server.

In order to determine the visually impacted area(s), in some embodiments, the content server may perform local rendering or low sample rate scene visibility/light transport simulation. An indication (e.g., an estimation) of the impacted areas may be then signaled back to the viewing client by the content server. In some embodiments, the indication includes list of impacted assets, but in other embodiments, the indication may be in a different form. Once the viewing client receives the indication of the impacted areas, the client may download assets corresponding to those areas in a full 3D format to be rendered locally.

More specifically, referring to FIG. 9, the process may start at step 902 when one or more viewing clients, e.g., (i) request a new session from a content server, (ii) request for scene 3D assets and/or surface light fields, as needed, from the content server, or (iii) signal other type of information to the content server including an indication of a dynamic behavior of scene element(s). At step 904, the content server waits for request(s) or signaling from viewing client(s). For purpose of illustration only, the example of FIG. 9 will assume that the content server receives a request or signaling from a single viewing client. However, in practice, the content server may handle multiple client requests and/or signaling, and process each client request or signaling according to the example process shown in FIG. 9.

At step 906, the content server determines if communication received from the viewing client is a client request or if the client is signaling scene dynamic behavior(s). The client request may be, for example, one of two types of requests: (1) a request associated with a start of a new session (e.g., an initial request for scene meta-data for a 3D scene) or (2) a request for scene 3D asset(s) and/or surface light fields, as needed.

In one example, the request for scene 3D asset(s) and/or surface light fields may be based on the scene meta-data that has been already sent to the viewing client by the content server (such as based on an earlier client request for a new session). In another example, the viewing client may generate such request during client execution of scene logic, where interactive (dynamic) element(s) of the scene may be requested/downloaded from the content server and rendered locally on the client side.

If, at step 906, the content server determines that the client communication is a client request, the process moves to step 908 at which the content server determines a type of the received client request. If, at step 908, the request is determined to be a request associated with a start of a new session by the viewing client, the process moves to step 916, at which scene meta-data is sent to the viewing client by the content server. The scene meta-data may be stored at or otherwise made available to the content server (step 924).

Afterwards, the process may return to step 904. As described earlier, based on the scene meta-data, the client may then request and download surface light fields and scene 3D assets, as needed, to be rendered locally by the viewing client.

If, at step 908, the request is determined to be a request for scene 3D asset(s) and/or surface light fields, the process moves to step 910 at which the content server sends (to the viewing client) data according to such request (e.g., the content server sends surface light field representation(s) and/or 3D assets for requested scene element(s)). Although not explicitly shown in FIG. 9, the content server may store (or otherwise have an access to) data of a scene in a full 3D format and data representative of surface light fields. Then, at step 912, the content server may determine whether an end of content serving processing has been requested (e.g., explicitly by the client or otherwise), and if so, terminate the process at step 914. Otherwise, the process may return back to step 904.

Referring back to step 906, as noted above, in this step, the content server may determine that, instead of the client request, the content server has received (from the viewing client) a signal indicating scene dynamic behavior(s). For instance, as described in connection with FIG. 7, the viewing client may process user input and the scene logic, and update a viewpoint accordingly. Afterwards, when executing a 3D scene experience, the viewing client may signal an indication of (interactive) dynamic behavior(s) (e.g., an indication of a dynamic behavior of one or more scene elements) and the viewpoint back to the content server.

If that is the case, the process moves to step 918 at which the content server determines scene area(s) affected by the dynamic behavior(s) indicated by the viewing client. In this regard, as described in connection with FIG. 7, the content server, having, e.g., full 3D scene information may evaluate which area(s) of the full scene are impacted by the interactive behavior(s)/dynamic elements(s), and, at step 920, signal that information back to the viewing client by, e.g., providing an indication of assets impacted by the dynamic behavior(s). As further noted above, in order to determine the visually impacted area(s), in some embodiments, the content server may perform local rendering or low sample rate scene visibility/light transport simulation. Further, the indication (e.g., an estimation) of the impacted area(s) may be in the form of a list of impacted assets or in some other form.

In response, at step 922, the content server receives (from the viewing client) a request for one or more scene elements in a 3D asset format to be rendered locally by the viewing client. For example, a dynamic behavior of a particular element may impact one or more other different elements (e.g., static elements). Accordingly, the client may request 3D assets corresponding to those different element(s) that have been affected by the dynamic behavior of that particular element.

The process may then return to step 908. Then, at step 910, the content server would send (to the viewing client) data according to the 3D asset request the content server. In this particular case, the content server would, e.g., provide the viewing client with data corresponding to information defining one or more scene elements (that were affected by the scene dynamic behavior(s)) in a 3D asset format. Although not explicitly shown in FIG. 9, in addition to the requested element(s) in a 3D asset format, in some embodiments (as described earlier), the content server may also update surface light fields. Accordingly, at step 910, the content server may also send the updated surface light fields to the viewing client so that the client may, e.g., download and render locally a combination of the of the surface lights fields and the requested 3D assets.

The process may then proceed to step 912 at which the content server determines whether the end of content serving processing has been requested. Subsequently, the process either loops back to step 904 or terminates at step 914.

Example Viewing Client Processing

Figure 10:
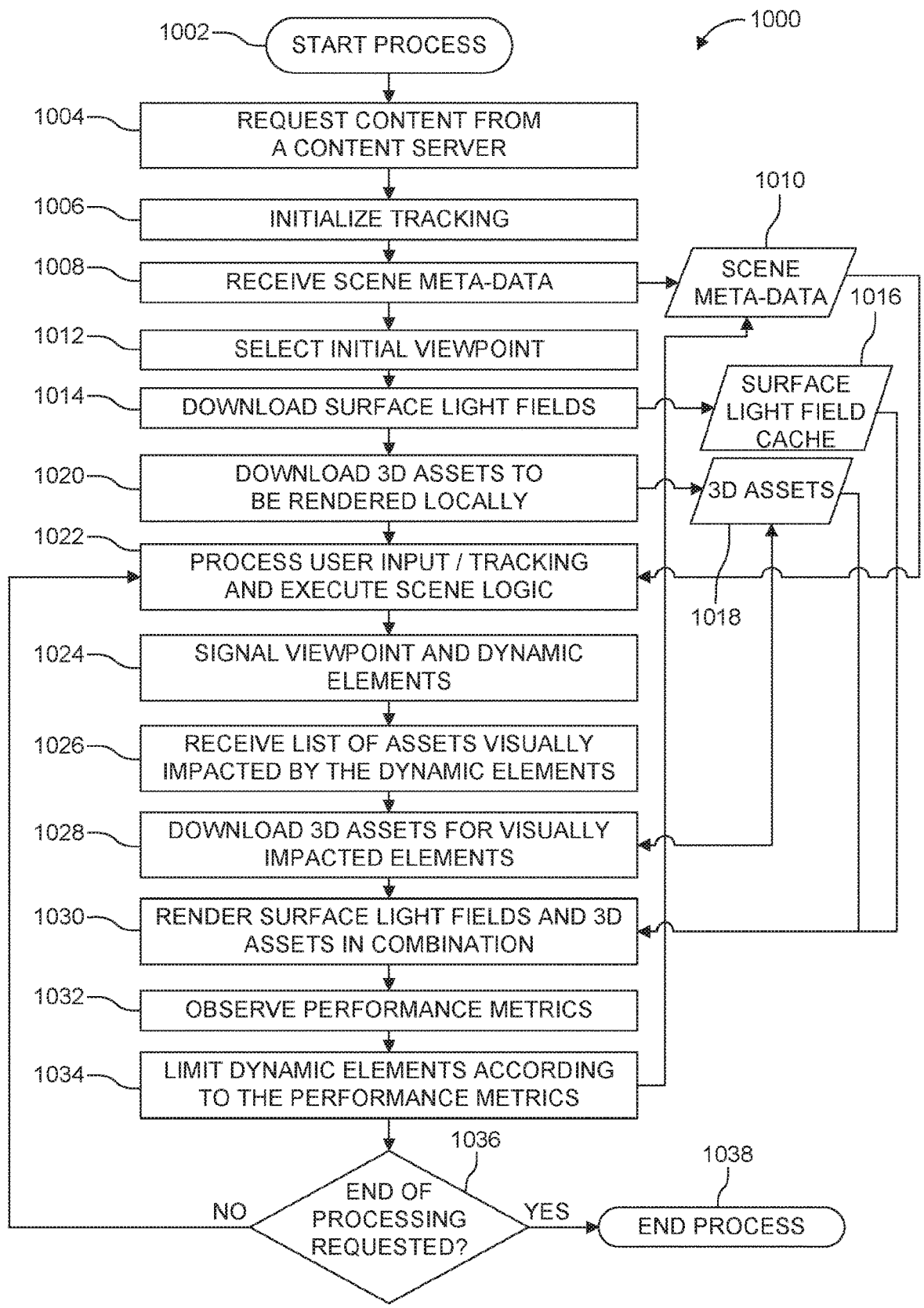
FIG. 10 is a flow chart illustrating an example processing executed by a viewing client, in accordance with some embodiments.

FIG. 10 is a flow chart 1000 illustrating an example processing executed by a viewing client, in accordance with some embodiments. In some embodiments, at step 1002, the process executed by the viewing client starts when a user, for example, launches on a client device an application implementing the viewing client. For instance, when the user starts the application, he or she may also define content to be viewed. In some embodiments, content includes a link to scene meta-data residing on a content server. The link to the scene meta-data may be a Uniform Resource Locator (URL) identifying the content server and a specific file stored at the server. The viewing client application may be launched either by an explicit command provided by the user (e.g., via a suitable user input) or automatically by an operating system of the client device based on a request identifying content type and an application associated with that specific content type. In this regard, in some embodiments, rather than being a stand-alone application, the viewing client maybe integrated with a web browser, may be integrated with a social media client, and/or or may be a part of the operating system.

In some embodiments, when the viewing client application is launched, the application launch may also initialize sensor data collection. Further, in some embodiments, when the viewing client has initialized sensor data collection, the viewing client may select an initial viewpoint and select surface light field and full 3D asset(s) to be downloaded initially using the scene meta-data. Accordingly, at step 1004, the viewing client requests content from a content server, and at step 1006 initializes tracking of user input. The user input may include tracking of the user head that controls the viewpoint within the 3D content when HMD is being used and/or tracking of other input devices/user motions that the user can use to control the virtual experience created with the 3D content.

At step 1008, the viewing client receives scene meta-data from the content server. At step 1010, the viewing client may store (e.g., locally at the client) the received scene meta-data for execution. Based on the scene meta-data, at steps 1012 and 1014, the viewing client may request and download surface lights fields and 3D assets to be rendered locally. At step 1010, the viewing client selects a (initial) viewpoint. Based on the scene meta-data, at steps 1012 and 1014, the viewing client may request and download surface lights fields and 3D assets to be rendered locally. The surface light fields and 3D assets may be locally stored, at steps 1016 and 1018, such as in respective caches at a client device. Note that, although steps 1012 and 1014 are shown as separate steps, those steps may be combined in to a single step (e.g., the viewing client downloading both types of assets at the same time), executed concurrently, etc.

Once the viewing client completes a download of the surface light fields and the 3D assets, the viewing client may begin to execute a virtual experience by processing the sensor data and user input and updating the scene based on the processed input data and scene logic described in the scene meta-data. As the client executes the scene logic, some scene elements may feature dynamic behavior as a result of the executed scene logic and the user input. In some embodiments, the viewing client signals an indication of all elements currently having dynamic behavior to the content server. Namely, at step 1020, the viewing client may process user input and scene logic (included in the scene meta-data), and, at step 1022, update the viewpoint and signal a current viewpoint and an indication of dynamic element(s) to the content server. The viewing client may also signal to the content server a current pose (e.g., a transformation in terms of scene graph coordinates) of those elements, together, e.g., with the current viewpoint used for displaying the scene to the user.

Based on the client signaling of the interactive dynamic behaviors, the content server determines (e.g., estimates) scene elements visually impacted by those behaviors and signals a suitable indication of the visually impacted elements back to the viewing client. Accordingly, in some embodiments, at step 1024 (update), the viewing client may receive the indication, which by way of example, is a list indicating assets for one or more elements visually impacted by the dynamic element(s). Accordingly, at step 1026, using the list of the impacted assets received from the content server and also, for example, inspecting the scene meta-data (especially, e.g., scene logic of assets around a current user location and timeline information for near future events), the client may decide which scene element(s) to request in a full 3D (asset) format in order to be able to perform rendering locally. This way, the client may be able to visualize impact of interactive dynamic behaviors in real-time. When the client decides which elements to request in a 3D format, at step 1028, the client may then download corresponding 3D assets (or the assets corresponding to the visually impacted elements) from the content server. As shown in FIG. 10, the viewing client may locally store the downloaded corresponding 3D assets in, e.g., a local cache (step 1018).

In some embodiments, the viewing client may continuously update and render the scene. According to illustrative embodiments, in rendering of the scene, as shown in FIG. 10, at step 1030, the viewing client combines surface light field representation(s) and asset(s) downloaded in their full 3D format to be rendered locally using, e.g., normal 3D rendering. In this regard, as depicted in FIG. 10, the viewing client may pull the surface lights fields and 3D assets from, e.g., local storage (see steps 1016 and 1018). Further, in some embodiments, during rendering of the combination, geometries of surface light field assets and 3D assets may be uploaded to a graphics processing unit GPU as normal geometry in a unified coordinate space when the viewing client has first removed the geometry representing assets in full 3D format from the surface light field geometry. This functionality may be performed by the viewing client using the geometry correspondence described, for example, as a part of the scene meta-data. Once the up-to-date geometry of both surface light fields and individual assets in full 3D format are present in the graphics processing unit (GPU), the GPU may perform rendering normally, while using, for instance, surface light field specific shaders on surface light field geometry that takes into an account texture processing of the current viewpoint.

Furthermore, during the execution of the (virtual) experience, in some embodiments, at step 1032, the viewing client may also observe one or more performance metrics, such as, e.g., a processing load and a rendering frame rate, in an effort to create a balance between dynamic interactive events in the scene and processing resources. As an example, in some embodiments, if a processing performance drops (e.g., the processing resources are insufficient to process amount of dynamic interactive events present in the experience), at step 1034, the viewing client limits dynamic elements according to the observed performance metrics. By way of example, the viewing client may limit a number of interactive events and, e.g., a number of assets featuring interactive dynamic behavior in order to maintain processing within client device performance limits, and thus maintain quality of experience.

In some embodiments, continuous execution of the experience is carried out by the viewing client until an end of processing is requested by either the user or is indicated by the scene logic in the scene meta-data. More particularly, at step 1036, the viewing client checks whether an end of processing has been requested, and if not, the process returns to step 1020. Otherwise, the process terminates at step 1038

Figure 11:
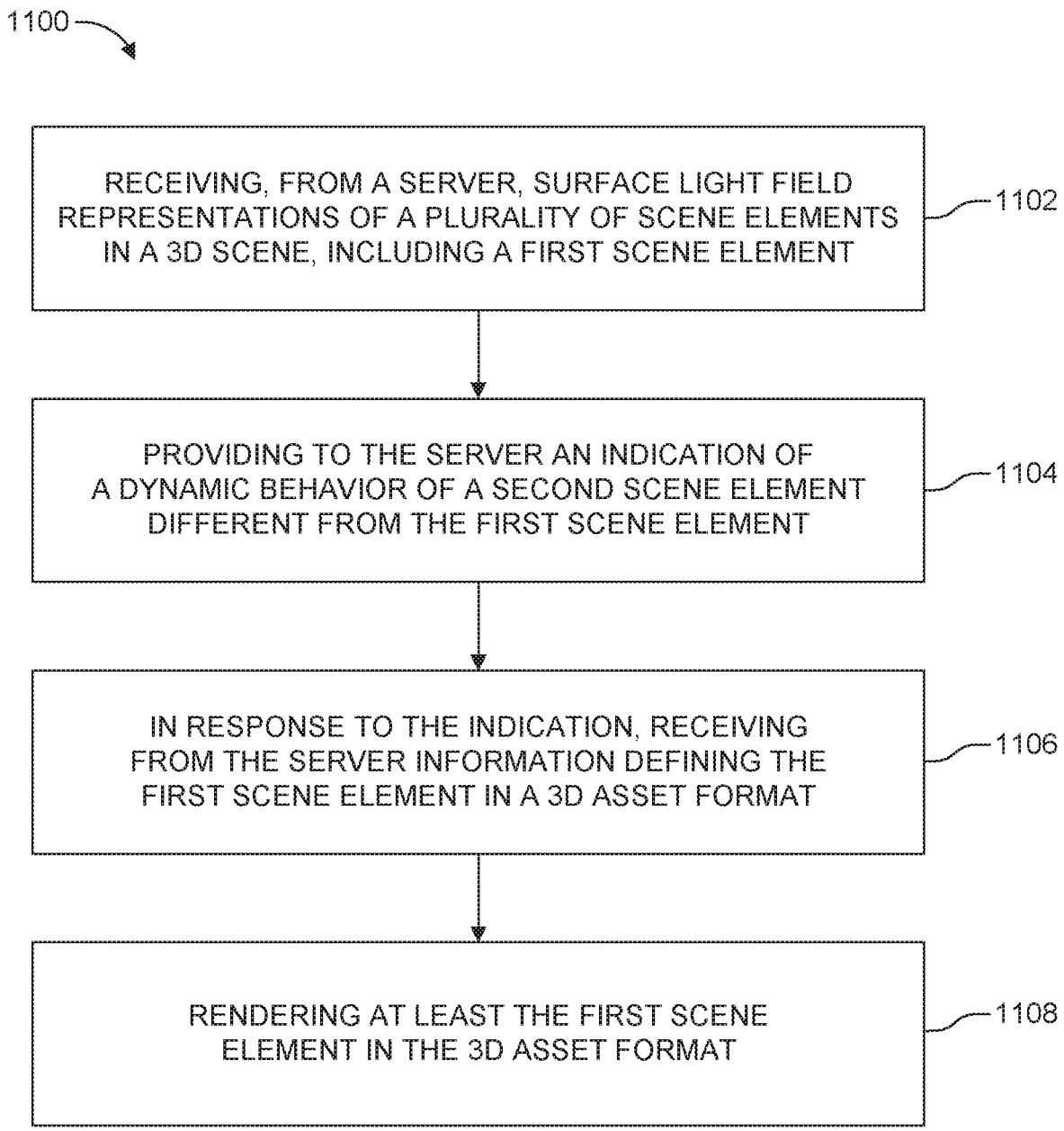
FIG. 11 is a flow chart illustrating an example method, in accordance with some embodiments.

FIG. 11 is a flow chart illustrating an example method 1100, in accordance with some embodiments. In illustrative embodiments, the method is performed by a client device (including, e.g., a viewing client as described above). At step 1102, the client device receives, from a server, surface light field representations of a plurality of scene elements in a 3D scene, including a first scene element. At step 1104, client device provides to the server an indication of a dynamic behavior of a second scene element different from the first scene element. At step 1104, in response to the indication, the client device receives from the server information defining the first scene element in a 3D asset format. Finally, at step 1106, the client device renders at least the first scene element in the 3D asset format.

Figure 12:
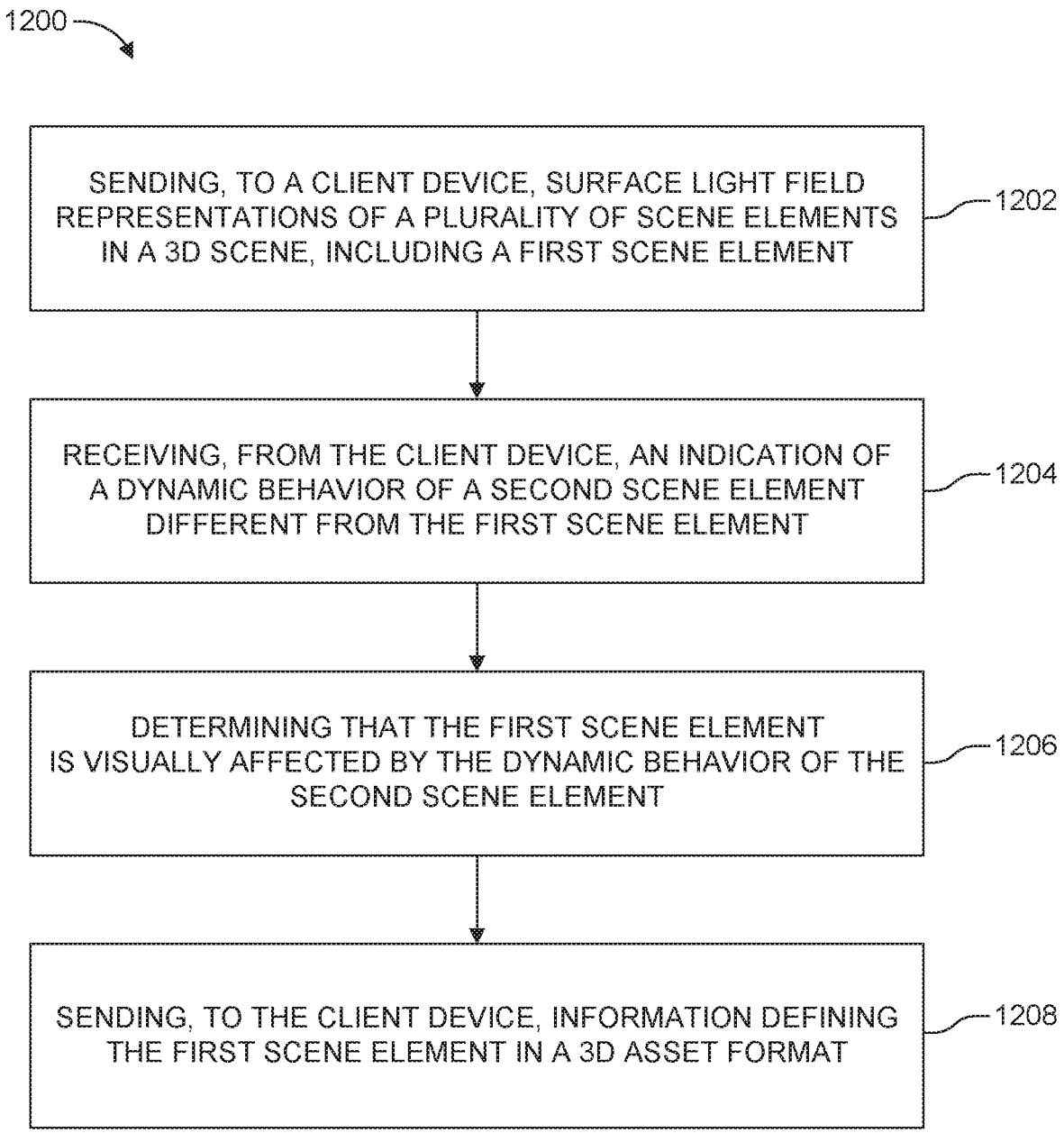
FIG. 12 is a flow charts illustrating another example method, in accordance with some embodiments.

FIG. 12 is a flow chart illustrating an example method 1200, in accordance with some embodiments. In illustrative embodiments, the method is performed by a server (e.g., a content server as described above). At step 1202, the server sends, to a client device, surface light field representations of a plurality of scene elements in a 3D scene, including a first scene element. At step 1204, the server receives, from the client device, an indication of a dynamic behavior of a second scene element different from the first scene element. At step 1206, the server determines that the first scene element is visually affected by the dynamic behavior of the second scene element. Finally, at step 1108, the server sends, to the client device, information defining the first scene element in a 3D asset format.

Some Variations of Example Embodiments

Example variations involving a server-side processing, in accordance with some embodiments, will now be described.

Various embodiments described herein primarily use client-based pull model, where, e.g., all content updates and downloads are determined by a viewing client. In alternative embodiments, at least a portion of processing may be shifted onto a server side.

To illustrate, in some embodiments, the server may process part of content rendering. In one such variation, the content server, when determining (e.g., estimating) a visual impact of interactive dynamic behavior of one or more scene elements, may also determine (e.g., estimate) if some of the visual impact(s) can be rendered on the server side. For example, in some embodiments, the content server may update a certain area of a surface light field texture that is specific to the viewing client or the content server may pre-produce several versions of the surface light fields in an anticipation of certain impacts from the dynamic behavior(s). Subsequently, during a run time, the content server can swap between multiple surface light field versions depending on the state of the dynamic behavior(s). As a result, in some cases, the viewing client may not operate to download full 3D assets from the content server but instead just receive from the server a minimal texture update for the existing surface light field.

In some embodiments, the content server may extend surface light fields from static elements to also pre-defined dynamic elements. In this regard, instead of providing a single surface light field, the content server may provide streamed surface light field geometry and textures containing, e.g., pre-defined dynamic deformations and changes. In this example variation, the server may provide a more complex content distribution to support streaming nature of a portion of the content and, for example, may also provide some signaling to the client when updates to the surface light field data are available.

In some embodiments, a navigation area supported by the surface light field may be extended by having or producing not just a single viewing volume, but instead, producing several interleaved navigation areas on the server side so that the viewing client can swap from one viewing area to another viewing area, such as to enable, for instance, a wider area 6DoF navigation.

Various example embodiments of the present disclosure have been described herein above. Further, some example concepts in various methods described herein may include, without limitation, the following concepts listed below.

In some embodiments, surface light fields used to represent static scenes are combined with real-time rendering of interactive elements.

In some embodiments, content is delivered in a hybrid format. In this regard, scene elements may be available at a content server both as optimized surface light fields and full 3D assets. In some embodiments, a client is able to select complexity based on bandwidth and rendering power. In some embodiments, the client is signaled rendering complexity in addition to an object size and/or bitrate.

In some embodiments, the client signals dynamic scene behavior(s) to the content server, which then determines (e.g., estimates) which part(s) of the scene are impacted by the dynamic behavior(s). In this regard, the content server may update a media presentation description (MPD) or other manifest file. In some embodiments, client-side logic may be used with a scene graph (e.g., provided as a part of scene meta-data) to determine part(s) of scene and a level of detail to be requested from the content server.

In some embodiments, the content server determines correct content format for scene elements for the client, such as surface light fields for static elements and 3D assets for elements impacted by the dynamic behaviors.

In some embodiments, the content server signals an indication of the impacted elements back to the client. The client may download requested assets in a full 3D asset format and render the impacted elements locally.

In some embodiments, the client does not need to download a full scene in a full 3D asset format. Instead, in some embodiments, the client downloads, e.g., only a minimal number of elements in the full 3D asset format and, e.g., minimal real-time 3D rendering.

In some embodiments, the client adapts content to local capabilities of a viewing device by observing performance metric(s) and responsively limiting interactivity (interactive dynamic behavior) such as, e.g., to avoid local real-time 3D rendering so as not to exceed 3D rendering performance capabilities of the viewing device.

Additional (e.g., related) embodiments have been described hereinabove.

According to some embodiments, a method, performed by a client device, includes: requesting content from a server, the content including a three-dimensional (3D) scene having a plurality of scene elements; downloading, from the server, surface light field representations of selected scene elements; providing to the server an indication of a dynamic behavior of one or more scene elements; receiving, from the server, an indication of at least one scene element that is visually affected by the dynamic behavior of the one or more scene elements; downloading, from the server, the at least one visually affected scene element in a 3D format; rendering a combination of (i) the surface light field representations of the selected scene elements and (ii) the at least one visually affected scene in the 3D format; and displaying a result of the rendering to a user.

In some embodiments, the method further includes: prior to downloading the surface light field representation of the selected elements in the 3D scene, receiving from the server a scene description meta-data. The method may further include downloading, from the server, one or more 3D assets to be rendered locally at the client device.

In some embodiments, providing to the server the indication of the dynamic behavior of the one or more scene elements includes processing at least a user input and scene logic included in the scene description meta-data to determine the one or more scene elements that have the dynamic behavior as a result of the processing. Further, the client device may process sensor data collected by the client device.

In some embodiments, providing to the server the indication of the dynamic behavior of the one or more scene elements includes providing the indication together with a current viewpoint used for displaying the 3D scene to the user. In this regard, in the above methods, the surface light field representations of the selected scene elements are produced by the server. Further, in some embodiments, downloading, from the server, the at least one visually affected scene element in the 3D format includes the client determining to download the at least one visually affected scene element in the 3D format based on scene logic in the scene description meta-data. Here, the scene logic may include scene logic corresponding to assets around a current user location and timeline information for future.

In some embodiments, the above-methods further include observing one or more performance metrics; and limiting an amount of interactive behavior in the 3D scene when a local rendering performance at the client device falls below a threshold. The one or more performance metrics may include at least one of processing load or rendering frame rate. Further, limiting the amount of interactive behavior in the 3D scene includes limiting at least one of a number of interactive events or a number of scene elements having the dynamic behavior.

In some embodiments, the method may be executed repeatedly, and further include receiving, from the server, one or more updated surface light field representations.

In some embodiments, rendering the combination includes combining the surface light field representations of the selected scene elements and the at least one visually affected scene element in the 3D format together. In some embodiments, combining includes providing a combined geometry in a unified coordinate space to a graphics processing unit (GPU) for rendering.

According to some embodiments, another method, performed by a client device, includes: requesting spatial content from a server; receiving, from the server, a scene description meta-data describing the spatial content; based on the scene description content meta-data, selecting content elements to be rendered locally at the client; requesting, from the server, the selected elements in a surface light field or 3D asset format, wherein at least a portion of the selected elements is requested in the surface light field format; receiving, from the server, the requested elements; processing user input and scene logic contained in the scene description meta-data to determine one or more scene elements featuring dynamic interactive behavior; providing a current viewpoint and an indication of the dynamic behavior of the one or more scene elements to the server; receiving server estimation of at least one scene element impacted by the dynamic behavior of the one or more scene elements; downloading, from the server, the at least one impacted scene element in a 3D asset format; rendering and displaying a combination of surface light field elements and one or more scene elements corresponding to locally rendered 3D assets; and observing at least one performance metric and responsively limiting an amount of interactive behaviors if a local rendering performance falls below a threshold.

According to some embodiments, a client device includes a processor and a non-transitory computer-readable medium storing instructions that, when executed by the processor, cause the processor to perform any of the methods performed by the client device and disclosed hereinabove.

According to some embodiments, a method, performed by a server, includes: receiving a content request from a client device, the content including a three-dimensional (3D) scene having a plurality of scene elements; providing, to the client device, surface light field representations of selected scene elements; receiving, from the client device, an indication of a dynamic behavior of one or more scene elements; providing, to the client device, an indication of at least one scene element that is visually impacted by the dynamic behavior of the one or more scene elements; receiving, from the client device, a download request for the at least one visually impacted scene element in a 3D format; and providing, to the client device, the at least one visually impacted scene element in the 3D format.

According to some embodiments, a server includes a processor and a non-transitory computer-readable medium storing instructions that, when executed by the processor, cause the processor to perform any of the methods performed by the server and disclosed hereinabove.

According to some embodiments, a system includes: a content server configured to deliver content corresponding to a three-dimensional (3D) scene, wherein the content is delivered as surface light fields and 3D assets; and a client device configured to (i) receive the content, (ii) signal to the content server one or more static portions of the 3D scene affected by a dynamic behavior of one or more scene elements, and (iii) receive from the content server 3D assets corresponding to the one or more portions of the 3D scene affected by the dynamic behavior of the one or more scene elements.

According to some embodiments, disclosed herein is a method that includes combining surface light fields used to represent static scene elements with real-time rendering of interactive elements at a client device.

According to some embodiments, another method is disclosed that includes delivering content to a client device in a hybrid format, wherein the hybrid format includes surface light fields and three-dimensional (3D) assets, where a first portion of the 3D assets is delivered to the client device upon content request and a second portion of the 3D assets is delivered to the client device in response to the first portion causing a dynamic behavior affecting one or more static elements.

Further, according to some embodiments, a system is disclosed that includes a processor and a non-transitory computer-readable medium storing instructions that, when executed by the processor, cause the processor to perform any of the methods disclosed hereinabove.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, performed by a client device, the method comprising:
receiving, from a server, surface light field representations of a plurality of scene elements in a 3D scene, including a first scene element;
providing to the server an indication of a dynamic behavior of a second scene element different from the first scene element;
in response to the indication, receiving from the server information defining the first scene element in a 3D asset format; and
rendering at least the first scene element in the 3D asset format;
wherein the 3D asset format is a non-light-field 3D format, and wherein the surface light field representation of the first scene element includes a first mesh and wherein the information defining the first scene element in the 3D asset format comprises a second mesh, the first mesh having fewer vertices than the second mesh.

2. The method of claim 1, further comprising:
after providing to the server the indication of the dynamic behavior of the second scene element, receiving, from the server, a second indication of at least the first scene element being visually affected by the dynamic behavior of the second scene element.

3. The method of claim 2, further comprising:
in response to receiving the second indication of at least the first scene element being visually affected by the dynamic behavior of the second scene element, requesting, from the server, the first scene element in the 3D asset format locally at the client device.

4. The method of claim 1, further comprising:
observing one or more performance metrics; and
limiting an amount of interactive behavior in the 3D scene when a local rendering performance at the client device falls below a threshold.

5. The method of claim 1, further comprising:
in addition to receiving, from the server, the information defining the first scene element in the 3D asset format, further receiving, from the server, one or more updated surface light field representations, wherein rendering at least the first scene element in the 3D asset format includes rendering a combination of the first scene element in the 3D asset format and the one or more updated surface light field representations.

6. A method performed by a server comprising:
sending, to a client device, surface light field representations of a plurality of scene elements in a 3D scene, including a first scene element;
receiving, from the client device, an indication of a dynamic behavior of a second scene element different from the first scene element;
determining whether the first scene element is visually affected by the dynamic behavior of the second scene element; and
in response to a determination that the first scene element is visually affected by the dynamic behavior of the second scene element, sending, to the client device, information defining the first scene element in a 3D asset format;
wherein the 3D asset format is a non-light-field 3D format, and wherein the surface light field representation of the first scene element includes a first mesh and wherein the information defining the first scene element in the 3D asset format comprises a second mesh, the first mesh having fewer vertices than the second mesh.

7. The method of claim 6, further comprising:
after receiving from the client device the indication of the dynamic behavior of the second scene element, sending, to the client device, a second indication of at least the first scene element being visually affected by the dynamic behavior of the second scene element.

8. An apparatus comprising a processor configured to perform at least:
receiving, from a server, surface light field representations of a plurality of scene elements in a 3D scene, including a first scene element;
providing to the server an indication of a dynamic behavior of a second scene element different from the first scene element;
in response to the indication, receiving from the server information defining the first scene element in a 3D asset format; and
rendering at least the first scene element in the 3D asset format;
wherein the 3D asset format is a non-light-field 3D format, and wherein the surface light field representation of the first scene element includes a first mesh and wherein the information defining the first scene element in the 3D asset format comprises a second mesh, the first mesh having fewer vertices than the second mesh.

9. The apparatus of claim 8, wherein the processor is further configured to perform:
after providing to the server the indication of the dynamic behavior of the second scene element, receiving, from the server, a second indication of at least the first scene element being visually affected by the dynamic behavior of the second scene element.

10. The apparatus of claim 9, wherein the processor is further configured to perform:
in response to receiving the second indication of at least the first scene element being visually affected by the dynamic behavior of the second scene element, requesting, form the server, the first scene element in the 3D asset format locally at a client device.

11. The apparatus of claim 8, wherein the processor is further configured to perform:
receiving, from the server, scene description meta-data for the 3D scene;
based on the scene description meta-data, requesting, from the server, the second scene element in the 3D asset format to be rendered locally at a client device; and
receiving, from the server, information defining the second scene element in the 3D asset format.

12. The apparatus of claim 11, wherein the scene description meta-data includes scene logic corresponding to assets around a current user location and timeline information for future events, the processor further being configured to perform:
using the indication of the dynamic behavior of the second scene element in combination with the scene logic to determine which one or more scene elements, the one or more scene elements including the first scene element, to request from the server in the 3D asset format.

13. The apparatus of claim 11, wherein providing to the server the indication of the dynamic behavior of the second scene element includes processing at least a user input and scene logic included in the scene description meta-data to determine the second scene element that has the dynamic behavior as a result of the processing.

14. The apparatus of claim 8, wherein the processor is further configured to perform:
observing one or more performance metrics; and
limiting an amount of interactive behavior in the 3D scene when a local rendering performance at a client device falls below a threshold.

\* \* \* \* \*